(12) United States Patent
Higginson

(10) Patent No.: US 7,250,898 B2
(45) Date of Patent: *Jul. 31, 2007

(54) UNIVERSAL KEYBOARD

(75) Inventor: Timothy B. Higginson, Highland Park, IL (US)

(73) Assignee: Yuvee, Inc., Highland Park, IL (US)

( * ) Notice: Subject to any disclaimer, the term of this patent is extended or adjusted under 35 U.S.C. 154(b) by 424 days.

This patent is subject to a terminal disclaimer.

(21) Appl. No.: 10/770,832

(22) Filed: Feb. 3, 2004

(65) Prior Publication Data

US 2004/0155864 A1 Aug. 12, 2004

(51) Int. Cl.
*H03K 17/00* (2006.01)

(52) U.S. Cl. .............. 341/176; 341/22; 345/168

(58) Field of Classification Search ............... 341/176, 341/22, 23; 348/734; 345/168, 169
See application file for complete search history.

(56) References Cited

U.S. PATENT DOCUMENTS

| 4,712,105 A | 12/1987 | Kohler |
| 4,728,949 A | 3/1988 | Platte et al. |
| 4,918,439 A | 4/1990 | Wozniak et al. |
| 5,287,109 A | 2/1994 | Hesse |
| 5,412,377 A | 5/1995 | Evans et al. |
| 5,606,712 A | 2/1997 | Hidaka |
| 5,938,726 A | 8/1999 | Reber et al. |
| 6,256,020 B1 | 7/2001 | Pabon et al. |
| 6,264,559 B1 | 7/2001 | Lawrence et al. |
| 6,292,283 B1 | 9/2001 | Grandbois |
| 6,295,052 B1 | 9/2001 | Kato et al. |
| 6,348,878 B1 | 2/2002 | Tsubai |
| 6,396,480 B1 * | 5/2002 | Schindler et al. ........... 345/169 |
| 6,407,779 B1 | 6/2002 | Herz |

FOREIGN PATENT DOCUMENTS

| JP | 07-288614 | 5/1997 |
| JP | 11110108 | 4/1999 |
| JP | 200-014556 | 7/2001 |
| JP | 2001209469 | 8/2001 |
| KR | 2001-84571 | 9/2001 |

* cited by examiner

*Primary Examiner*—Brian Zimmerman
*Assistant Examiner*—Hung Q Dang
(74) *Attorney, Agent, or Firm*—Leydig, Voit & Mayer, Ltd.

(57) ABSTRACT

The present invention provides a multifunctional input device. The input device includes a functional mode which defines the mode of operation of the input device. Each functional mode includes one or more domain levels with each domain level containing one or more domain-level values. Each domain level-value within each functional mode is assigned to one of a plurality of programmable input keys. The domain-level value assigned to each programmable input key controls the function of that programmable input key within a given functionality and domain level. The present invention also includes a display to indicate the domain-level value associated with each of the programmable input keys within a given functionality.

33 Claims, 19 Drawing Sheets

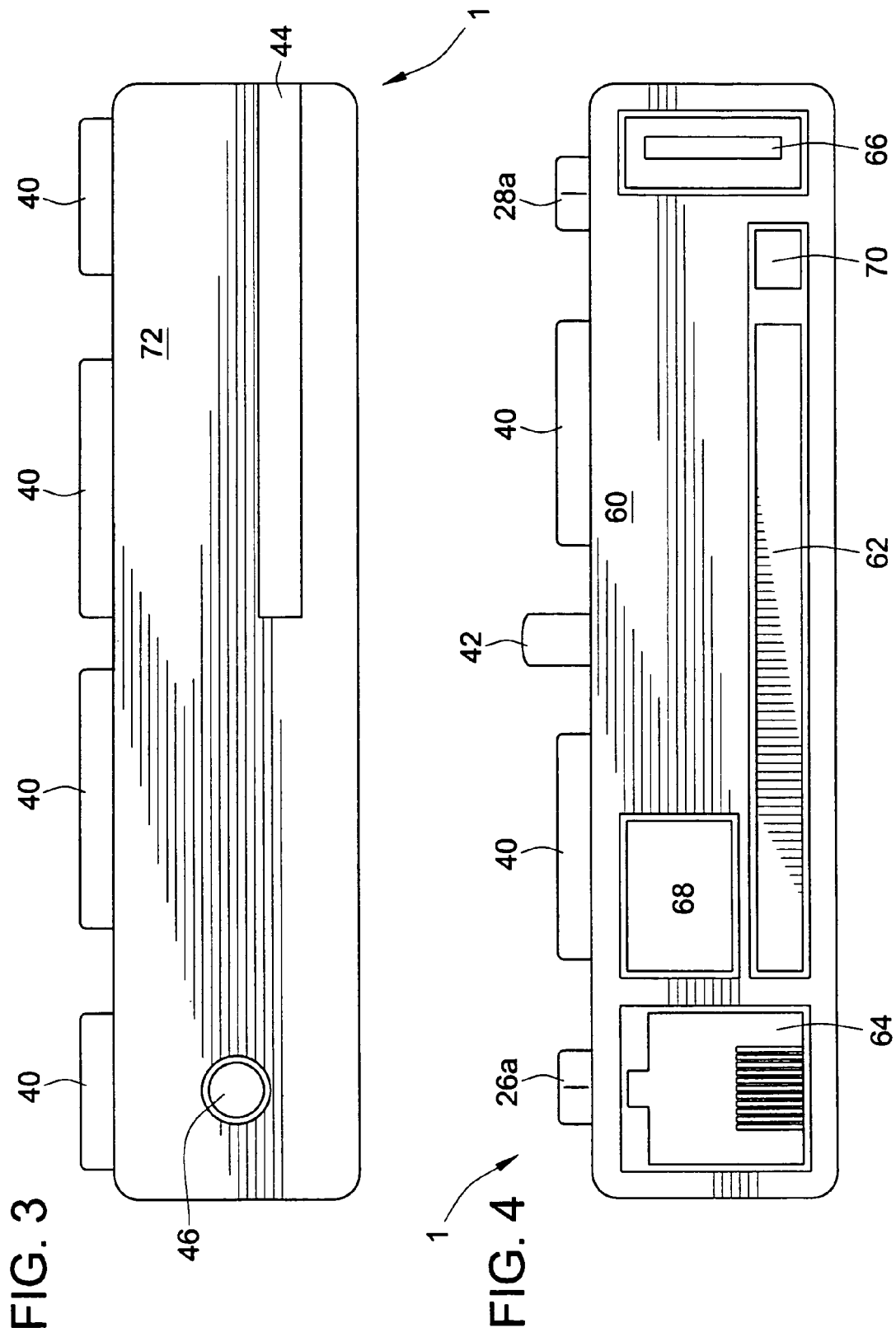

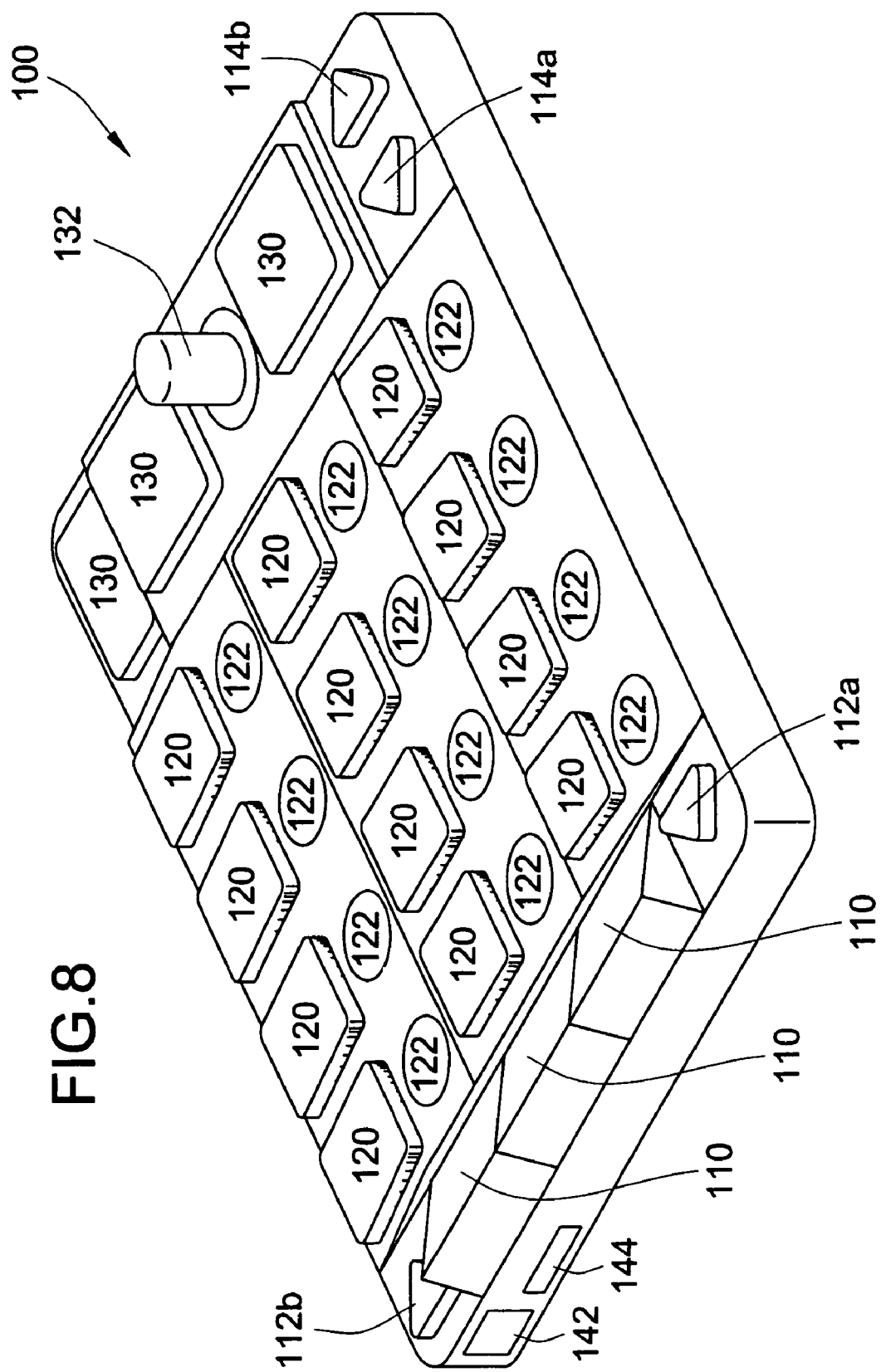

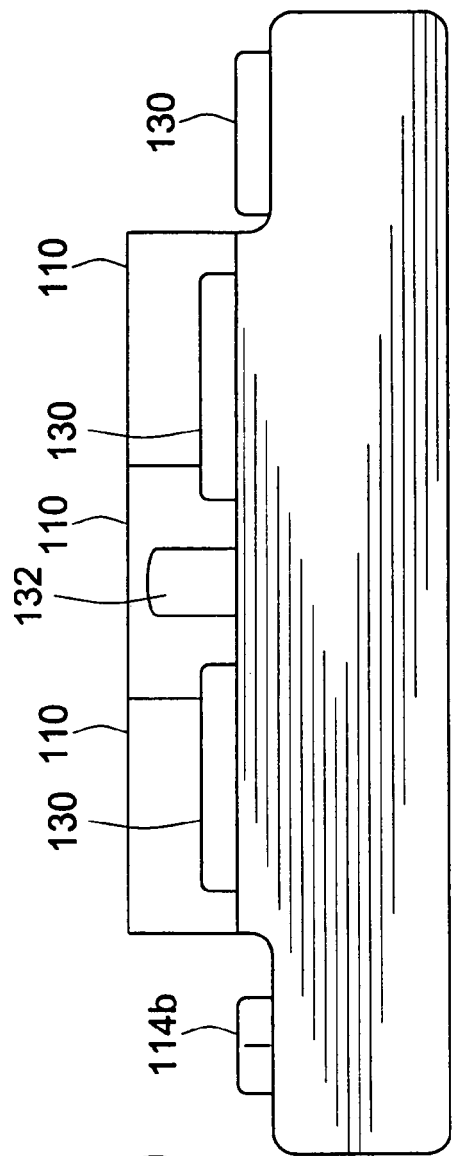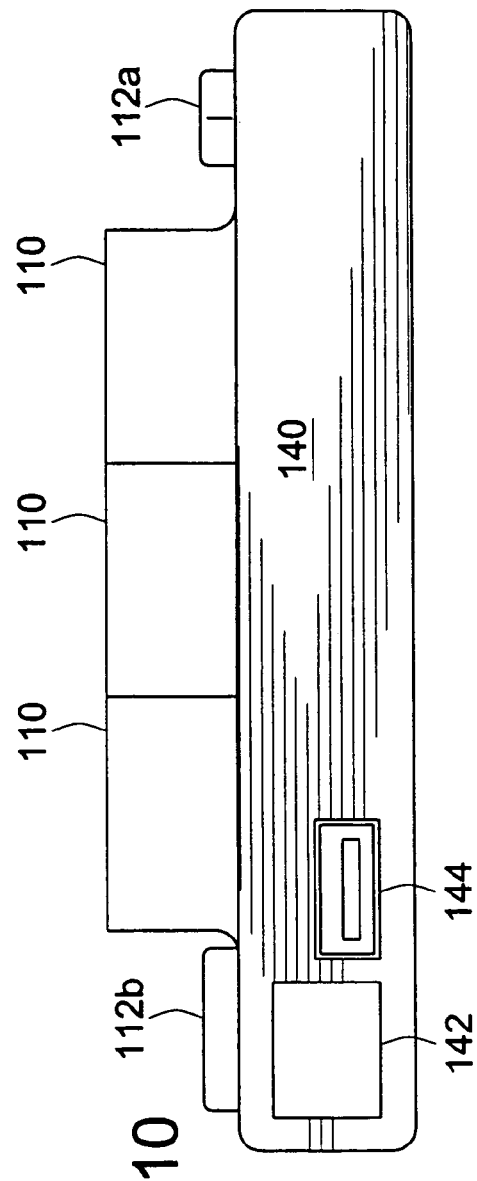

UNIVERSAL KEYBOARD

CROSS-REFERENCE TO RELATED PATENT APPLICATIONS

This application claims the benefit of Higginson, U.S. Non-provisional patent application Ser. No. 10/247,065, filed on Sep. 19, 2002, for "Universal Keyboard," which in turn claims the benefit of Higginson, U.S. Provisional patent application Ser. No. 60/323,680, filed on Sep. 20, 2001, the contents of which are incorporated herein by reference in their entirety, including any references therein.

FIELD OF THE INVENTION

The present invention generally relates to input devices, and more particularly, the invention relates to an improved design of a universal keyboard having one or more functionalities.

BACKGROUND OF THE INVENTION

Inputs for electronic devices (e.g., personal computers, lap-top computers, PDAs, cellular telephones, etc.) are routinely used every day by millions of people. The most common input device is a keyboard. The keyboard most commonly used today is the QWERTY keyboard. The name of the QWERTY keyboard is derived from the first six alphabetical characters on the left side of the first row of letters on the keyboard.

The QWERTY keyboard was developed in the late 1860's for the first mechanical typewriter and was subsequently patented by Christopher Sholes in 1878. Due to the mechanical complexity of first typewriters, the keyboard was intentionally designed to prevent the user from rapidly pressing consecutive keys, as this would jam the machine. As such, the arrangement of the keys on the QWERTY keyboard resulted from an accommodation to the mechanical nature of the first typewriters and not from an effort to ensure the efficient transfer of information by the keyboard user.

The QWERTY keyboard has been used as an input means since the development of the very first electronic devices. However, with the development of smaller, portable electronic devices, use of the QWERTY keyboard with these devices has certain drawbacks. As electronic devices have become smaller through advances in integrated circuitry, the traditional QWERTY keyboard is simply too large for many of the smaller electronic devices as the keyboard must be large enough to accommodate both hands of the user. Moreover, due the large size of the traditional keyboard, it is not sufficiently portable for use in conjunction with many of these electronic devices. Previous attempts to overcome this short coming of the keyboard have included the use of foldable keyboards as shown in U.S. Pat. No. 6,174,097 and the use of keyboards that allow for the direct connection of the electronic device to a full-size portable QWERTY keyboard as shown in U.S. Pat. No. 6,108,200. However, neither of these approaches reduces the area required for the use of the keyboard.

The miniaturization of many electronic devices has allowed them to be designed such that they can be operated with only a single hand of the user or has made their use incompatible with a full-sized QWERTY keyboard. Because the QWERTY keyboard was developed for two-handed use with the original typewriter, it can not be readily adapted for efficient use by only a single hand, or one or both thumbs when used in conjunction with many electronic devices.

Moreover, the size of the standard QWERTY keyboard, which can have in excess of 100 keys, often limits its versatility and utility as an input device. Prior attempts to circumvent those drawbacks of the QWERTY keyboard have included the use of a stylus in conjunction with a touch-screen display or other pressure sensitive surface for data entry. However, stylus-based methods of data entry are typically much slower for entering data, more difficult for users to learn, and have a higher error rate than keyboard-based data entry methods.

An additional drawback to the QWERTY keyboard is that it was designed to accommodate the mechanical components of the first typewriters, as such, the layout of its keys does not facilitate the rapid input of data from the keyboard. Previous attempts to increase the speed and efficiency of data input into an electronic device have included the development and use of voice-recognition software. However, the error rate typically associated with this type of software has thus far prevented its large-scale use as an effective input device.

Another drawback to the traditional QWERTY keyboard is that it has typically only had a single functionality, namely alphanumeric input. However, with the decrease in size of many of electronic devices, additional functions are required from a smaller keyboard that current keyboards cannot accommodate.

Previous attempts to overcome shortcomings of the QWERTY keyboard have included the use of alternative keyboards, such as the standard 12-key arrangement found on most telephone and cellular phones. A drawback of using the standard telephone as a data-input device is the slow rate of input due to use of only a single finger or thumb to activate the keys.

BRIEF SUMMARY OF THE INVENTION

The present invention provides a multifunctional input device. The input device includes a functional mode which defines the mode of operation of the input device. Each functional mode includes one or more domain levels with each domain level containing one or more domain-level values. Each domain level-value within each functional mode is assigned to one of a plurality of programmable input keys. The domain-level value assigned to each input key controls the function of that input key within a given functionality and domain level. The present invention also includes a display to indicate the domain-level value associated with each of the programmable input keys within a given functionality.

BRIEF DESCRIPTION OF THE DRAWINGS

FIG. 3 is a bottom end view of the keyboard;

FIG. 4 is a top end view of the keyboard;

FIG. 8 is a top isometric view of an embodiment of the universal keyboard as viewed from the top left-hand corner of the keyboard;

FIG. 9 is a bottom-end view of the keyboard shown in FIGS. 7 and 8;

FIG. 10 is a top-end view of the keyboard shown in FIGS. 7 and 8;

DETAILED DESCRIPTION OF THE INVENTION

Generally, the present invention relates to an input device. The input device has a first functional mode which defines the operation of the device as well as one or more domain levels within each functionality with each domain level containing domain-level values. Each domain level value is assigned to one of a plurality of programmable input keys. The present invention also includes a display to indicate the domain-level value associated with each input key. Although described in the context of a portable universal keyboard, it should be understood that the invention is not limited to such applications. The invention may be used in conjunction with other input applications or devices which use a variety of technologies, in lieu of, or in addition to, that which is described herein. For example, the invention described herein may be used as an integral part of another device such as the controls of an automobile, an airplane (arm rest, seat back or cockpit), a lap-top computer (replacing the current QWERTY-style keyboard), PDA (personal digital assistant), a cell phone (replacing the current standard key pad) or a household device such as a refrigerator or television set.

Figure 1:
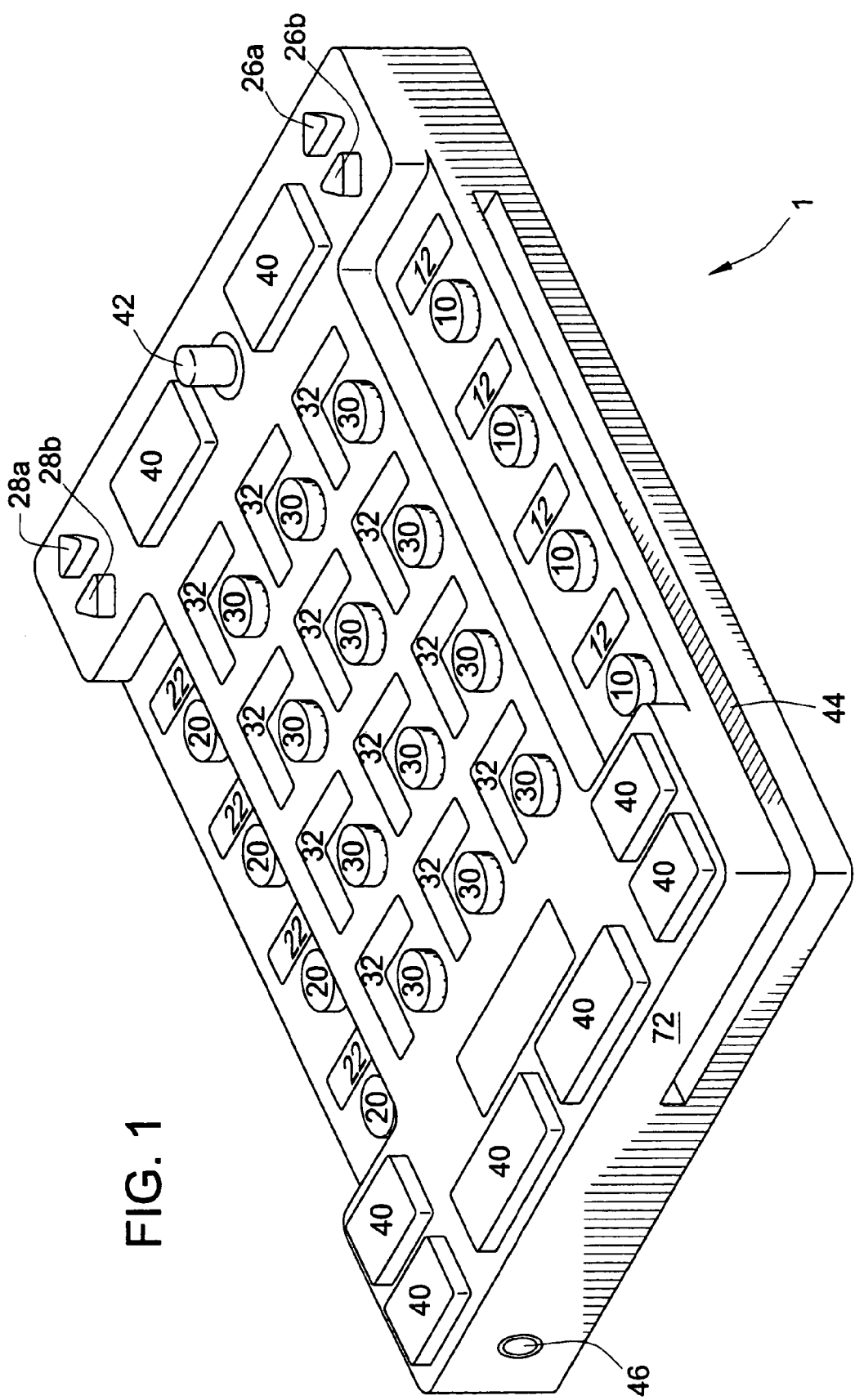
FIG. 1 is a top isometric view of the universal keyboard as viewed from the bottom right-hand corner of the keyboard.

FIG. 1 is a top isometric view of the universal keyboard 1. FIG. 1 illustrates functional-mode controls 10 for selecting the functional mode of operation of the keyboard 1. The functional mode of operation of the keyboard 1 is the overall operation of the keyboard and any peripheral attachments to which the keyboard is serving as an input device. For example, the functional mode of operation is selected, by way of example, from the group consisting of: an English alphanumeric keyboard, a non-English alphanumeric keyboard, telephone, calculator, card reader, text editing, internet navigation, an application-specific mode associated with the use of a particular software application and a mode associated with the control of an electronic device. Additionally, in embodiments of the invention, the keyboard 1 operates concurrently in more than one functional mode of operation. For example, the keyboard may be concurrently in both the E-mail and Alphanumeric functionalities to facilitate drafting an e-mail message. Other exemplary combinations of multiple simultaneous functional modes of operation include Edit/E-mail, Edit/Alphanumeric, Tele/www, Tele/Alpha, or E-mail/Tele/www.

Figure 5A:
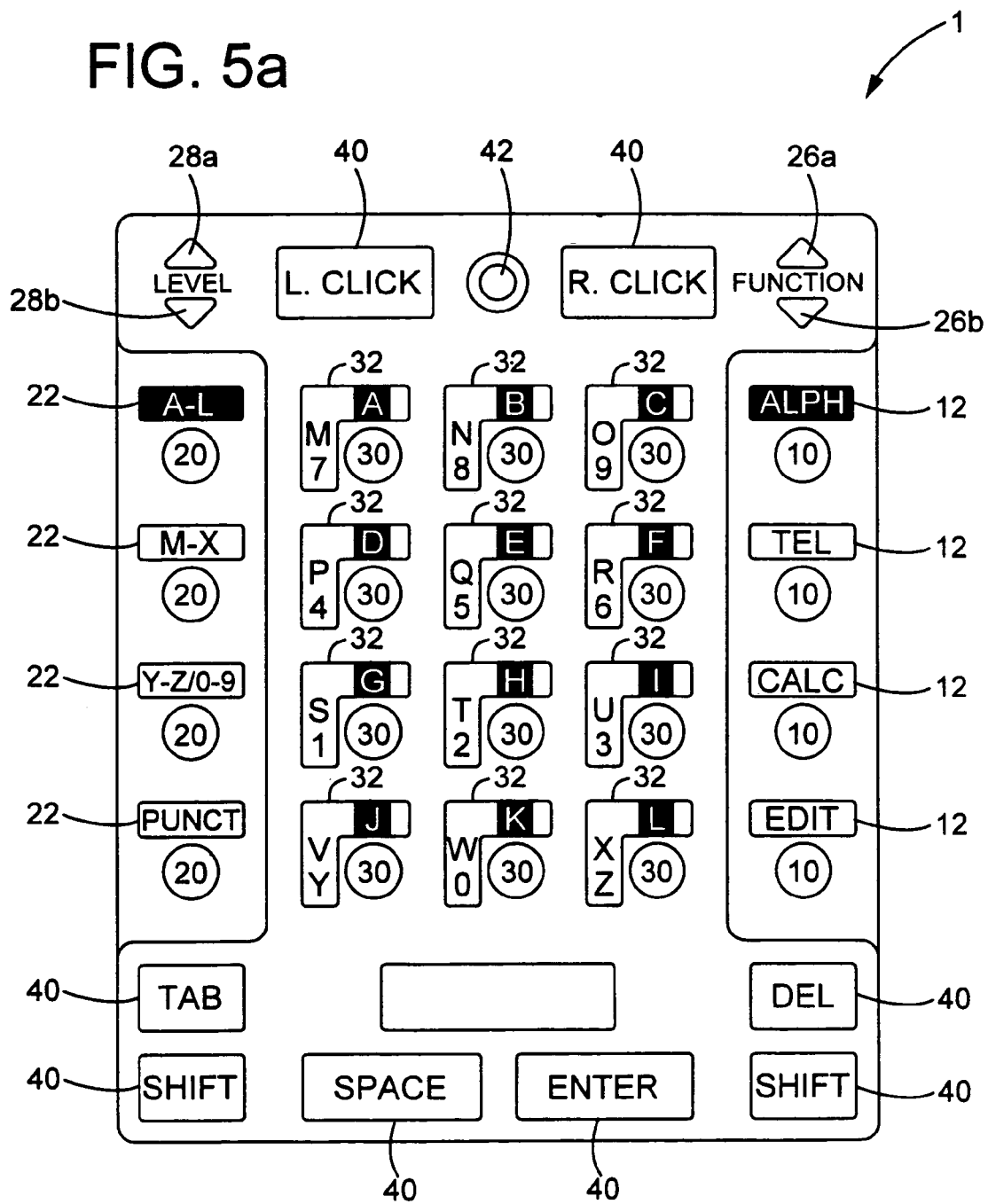
FIG. 5a is a top view of the keyboard illustrating the keyboard operating in alphanumeric functionality with the domain-level values assigned to each input key in the "A-L" domain level.

Also located on the keyboard 1 are domain-level controls 20 for selecting the desired domain level. Within each functional mode of operation of the keyboard is one or more domain levels. Each domain level contains one or more domain-level values. Each domain-level value is associated with an input key. The association of domain-level values to each input key 30 allows for the transmission of a signal upon actuating the particular input key 30. The creation of a signal generated by the actuation of an input key 30 allows for the transmission of the character, function, command, or data which appears in the displays 32. The association between a domain-level value and a particular input key 30 can be predetermined by the operation of the software associated with each functional mode or assigned by the user of the keyboard. Each domain-level value is assigned to an input key 30 for selection by the keyboard user. For example, if the keyboard is operating in the alphanumeric functionality and in the "A-L" domain level, then the domain-level value associated with the letter "A" will be assigned to the first programmable input key 30 on the left-hand side of the top row as shown in FIG. 5a.

Associated with each functional-mode control 10 is a functional-mode screen 12. The functional-mode screen 12 indicates which functional modes are activated upon actuating the functional-mode control 10 associated with each screen 12. In a similar manner, each domain-level control 20 has an associated domain-level screen 22 which indicates the contents of the domain level when the domain-level control 20 is actuated. Although the attached figures illustrate separate functional-mode screens 12 and domain-level screens 22 for each functional-mode control 10 or domain-level control 20, respectively, this is merely exemplary. The present invention also includes the use of more or fewer screens than shown in the attached figures.

Located on the keyboard 1 is a set of functionality scrolling controls (e.g., buttons) 26a and 26b for systematic display of the available functionalities that can be selected by the user of the keyboard 1. Actuating functionality scrolling control 26a, the list of keyboard functionalities scrolls such that alternative functionalities are displayed on the functional-mode screens 12 and can be selected by actuating the appropriate functional-mode control 10. For example, with functionalities 14 displayed in the functional-mode screens 12 of FIG. 1, actuating the functionality scrolling control 26a will then display functionalities 5-8. With functionalities 5-8 displayed, pressing the functionality scrolling control 26b allows functionalities 1-4 to be available for selection by the user. Although illustrated to scroll from functionalities 1-4 to functionalities 5-8, the present invention also includes scrolling capabilities such that any number alternative functionalities will appear on the functional mode screens 12 upon actuating the scrolling controls 26a and 26b.

Also located on the keyboard 1 is a set of domain scrolling controls 28a and 28b for selecting the desired domain level within a selected device functionality. Actuating domain scrolling control 26a displays additional levels available within a functionality on the domain-level screens 22. For example, with domain levels 14 displayed on the domain-level screens 22 for a given functionality, actuating domain scrolling control 28a displays additional domain levels for selection by the user. Similarly, with the new domain levels displayed, actuating the domain scrolling control 28b, the previously displayed domain levels will be displayed for selection by the user. Activating a domain scrolling controls 28a or 28b will change any number of domain levels assigned to the domain-level controls 20.

Programmable input keys 30 comprise a keypad for transmitting a signal associated with each domain-level value associated with a particular input key 30. Associated with each input key 30 is a display 32. The displays provide a visual indication of the current domain-level value associated with each input key 30 as well as alternative domain-level values available for that input key 30 within a selected functionality. Although the attached figures illustrate the use of displays 32 with each programmable input key 30, this is merely exemplary. The present invention also includes the use of programmable input keys 30 with fewer displays than are illustrated in the attached figures.

The functional-mode screens 12, domain-level screens 22 and the displays 32 can be made from methods for displaying data such as light-emitting diodes (LED), liquid-crystal display (LCD) or touch screens (thereby combining the screens/displays (12, 22, 32) and keys/controls (10, 20, 30) into a single element).

Also illustrated in FIG. 1 is a plurality of fixed keys 40 having a defined operation. The defined operation of each fixed key 40 is independent of the functionality of the input device selected by the user. The defined operation of the fixed keys are operations found on traditional keyboards such as Esc, Alt, Ctrl, Shift, Caps Lock, Tab, Enter, Backspace, Delete, and Spacebar. Additionally, these fixed keys can function in a manner identical to that of a right-mouse click, a left-mouse click or scroll. In other embodiments of the invention, the function of the fixed keys 40 are defined by the user of the keyboard 1. Also illustrated in FIG. 1 is a cursor control 42 for controlling the location of the cursor used in numerous software applications or other graphical user interface. The cursor control includes any form of an insertable or removable cursor control or other joystick for use in controlling the cursor location.

Although not depicted, the exemplary keyboard illustrated in FIG. 1 includes a microprocessor for controlling the operation of the keyboard. The processor executes data processing and control operations to assign and implement domain-level values assigned to each of the programmable input keys 30 and provides a visual indication of alternative domain-level values associated with each functional made of operation of the displays 32. The assignment of domain-level values to the programmable input keys 30 is accomplished through key-pad definition structures and procedures executed by the processor according to the selected functional mode or modes of operation of the keyboard.

Also shown in FIG. 1 is a card insertion slot 44 for receiving data from a card having data stored thereon in an information-bearing medium. The information-bearing medium can take a variety of forms, such as a magnetic-strip encoded card, a bar-coded card, a biometrically encoded card or other form of information encoded on a card. FIG. 1 also illustrates a jack 46 for receiving such items as a hand-free head set or headphones. Although not illustrated, the present invention also includes a microphone and/or speaker built into the universal keyboard 1. Other data-entry sources and input/output hardware will be known to those skilled in the art.

The items of the keyboard described previously such as the functional-mode controls 10, functional-mode screens 12, domain-level controls 20, domain-level screens 22, the scrolling controls 26a, 26b, 28a, 28b, programmable input keys 30 and the displays 32 are located within a single base unit having a housing which fits into a user's hand and protects the internal components of the keyboard 1. However, also contemplated within the scope of the present invention is a multi-sectioned keyboard where some of the keyboard components are located apart from the other keyboard components. Additionally, although each of the functional-mode controls 10, domain-level controls 20 and programmable input keys 30 are shown as buttons activated by the fingers of the user, alternative means of activating these buttons, such as the use of a stylus, is also contemplated by the present invention. Also within the scope of the present invention would be the use of touch-sensitive surfaces that are used in lieu of, or in addition to, the buttons and screens illustrated in the attached figures.

Figure 15:
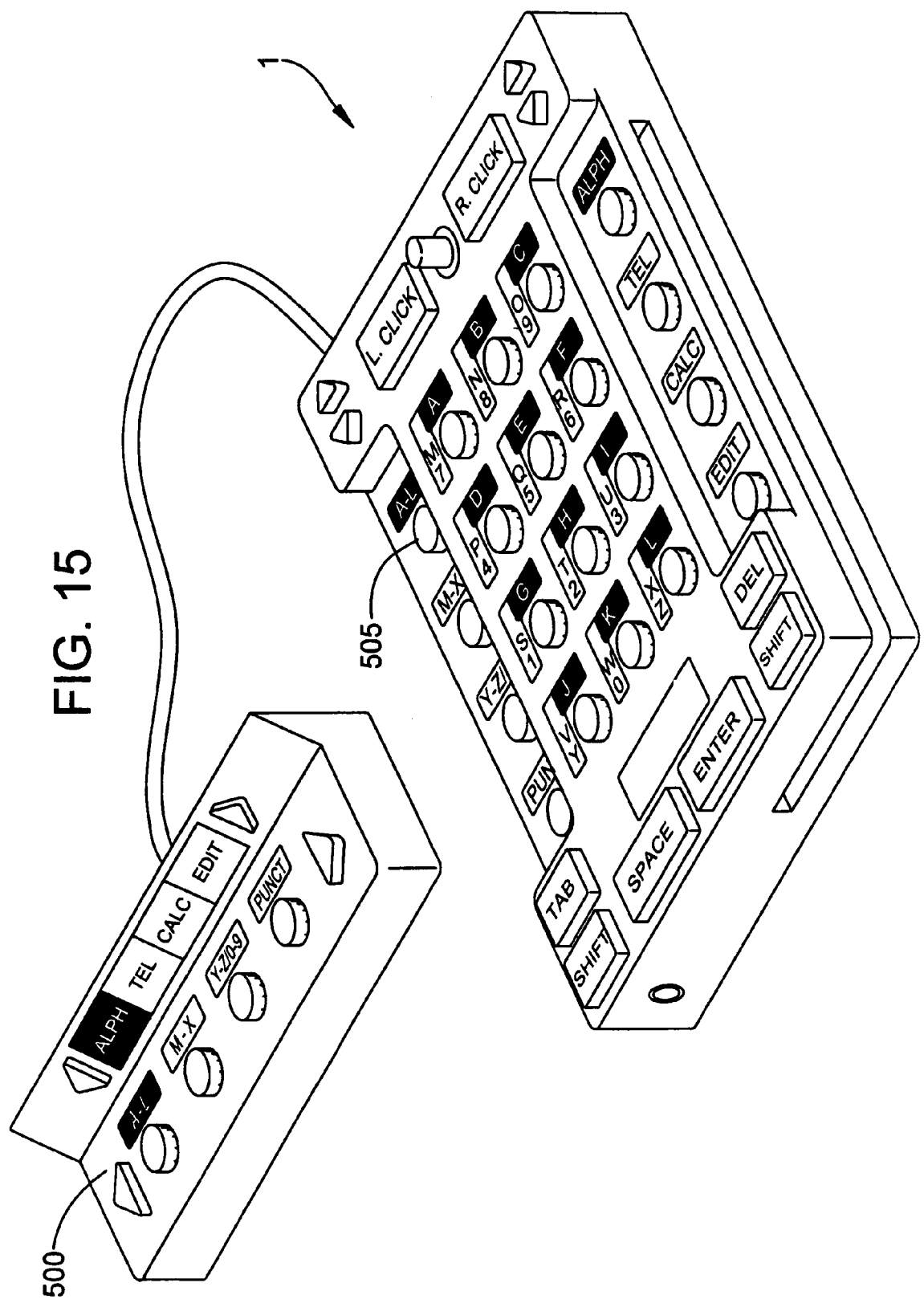
FIG. 15 is a top isometric view of the universal keyboard illustrating the use of an additional unit for two-handed operation of the keyboard.
Figure 16:
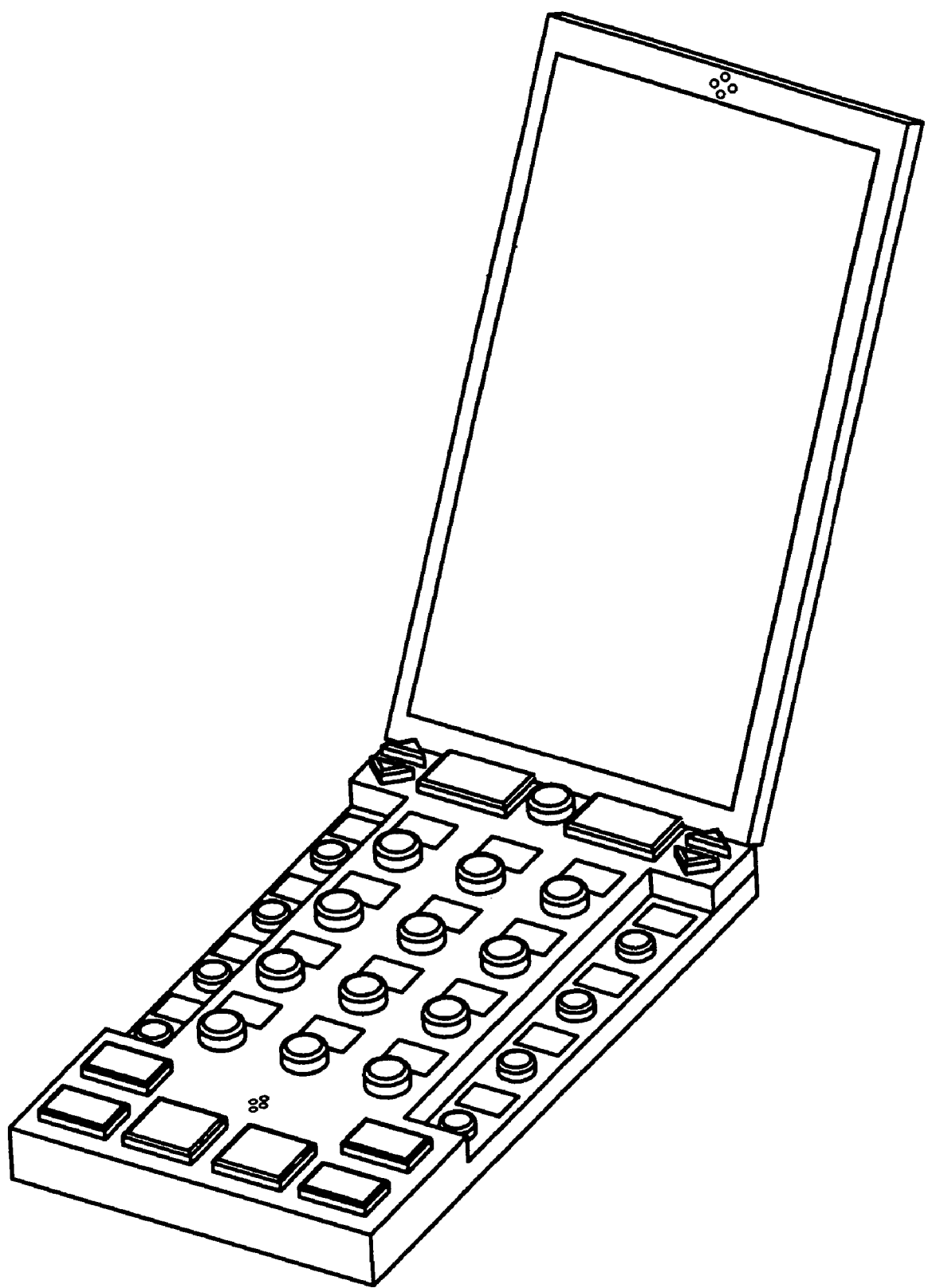
FIG. 16 is a top isometric view of the universal keyboard integral with a cellular telephone.

FIGS. 1-15 show the universal keyboard 1 as being a stand-alone input device. However, the keyboard 1 can be incorporated into any device, such as a cellular telephone as shown in FIG. 16. In embodiments of the invention, for example, the invention described herein may be used as an integral part of another device such as an automobile, an airplane (e.g., arm rest, seat back or cockpit), a lap-top computer (replacing the current QWERTY-style keyboard), PDA (personal digital assistant), a cell phone (replacing the current standard key pad) or a household device such as a refrigerator or television set. The included figures illustrating the keyboard as a stand-alone input device are merely exemplary and do not constitute a limitation of the present invention.

Figure 2:
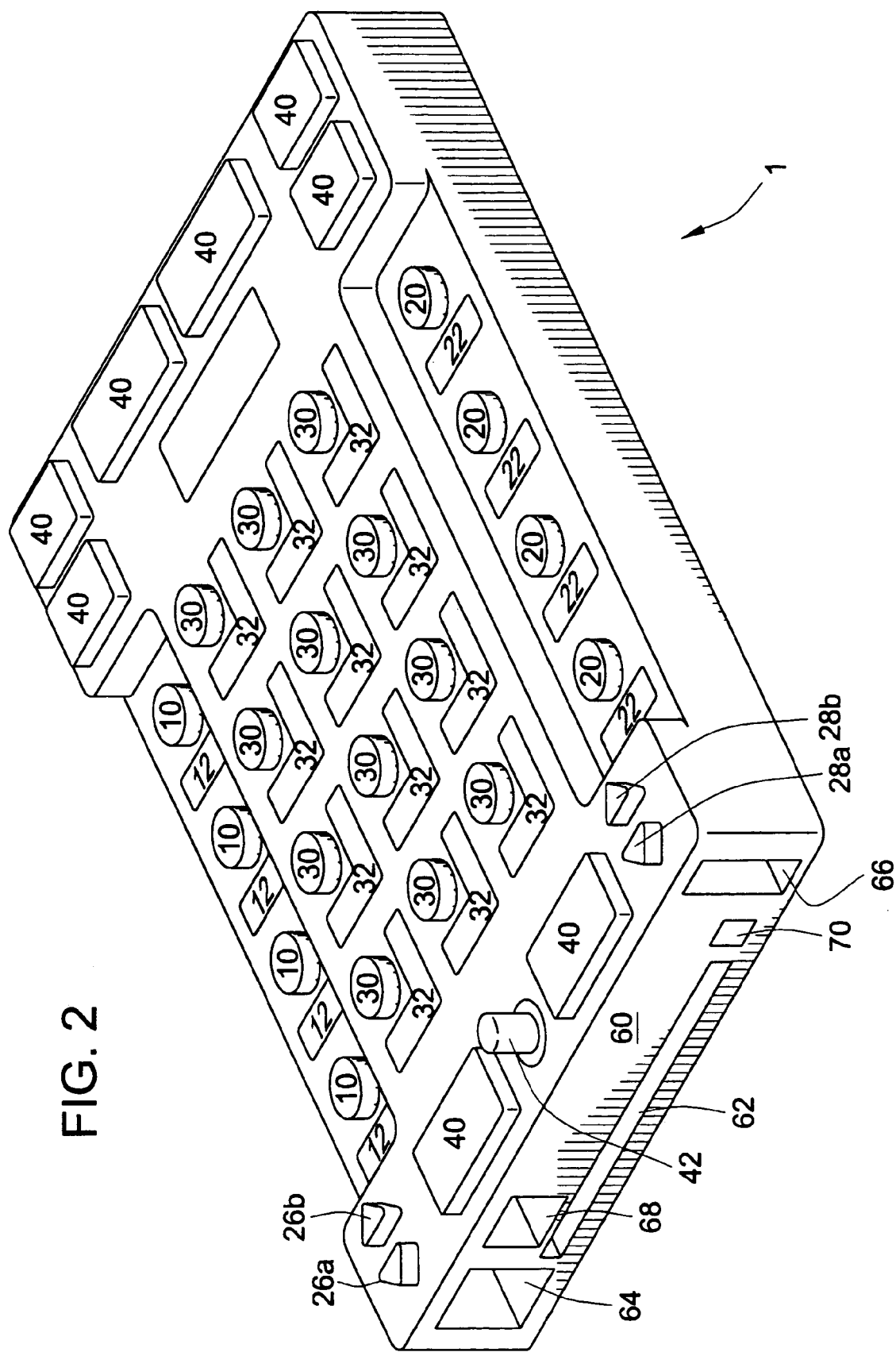
FIG. 2 is a top isometric view of the universal keyboard as viewed from the top left-hand corner of the keyboard.

FIG. 2 is a top isometric view of the universal keyboard 1 as viewed from the top left-hand corner of the keyboard. All of the operational features of the keyboard 1 are identical to that described in connection with FIG. 1. FIG. 2 illustrates additional connections to the universal keyboard located in the top of the keyboard 60 below the scrolling controls 26a, 26b, 28a, 28b and the cursor control 42.

Although shown to be located in the top of the keyboard, the location of these additional connections can be placed at any convenient location on the keyboard. The additional connections include a slot 62 for an insertable electronic circuit card wherein the slot is configured in accordance with one of the standard designs used for insertable electronic circuit cards such as any of the PCMCIA standard sizes, a port configured to interface with a telephone line that is part of a public-switched telephone network (PSTN) 64, a USB port 66, a serial-port interface, a parallel-port interface, and/or an expansion slot configured to receive a memory card 68. FIG. 2 also illustrates an infrared port 70, which enables the universal keyboard to wirelessly transmit or receive data. Although not depicted in the exemplary keyboard in FIG. 2, additional connections are incorporated into the keyboard 1 including a jack for the connection of an additional unit for operating the keyboard with two hands as shown in FIG. 15 as well as connections for other electronic devices that the keyboard 1 is sending or receiving information to or from.

A person of skill in the relevant art would recognize that other expansion capabilities could be incorporated into the keyboard other than those listed and that the aforestated list of additional connections to the universal keyboard is merely illustrative and not meant to be limiting in any manner.

FIG. 3 is a bottom end view of the universal keyboard 1. FIG. 3 illustrates the jack 46 and the card insertion slot 44 located in the bottom end 72 of the keyboard. The jack 46 and card insertion slot 44 are as described in connection with FIG. 1. Also shown in FIG. 3 is the end view of some of the fixed keys 40.

FIG. 4 is a top end view of the universal keyboard 1. FIG. 4 illustrates additional connections which are optionally included with the universal keyboard. The additional connections are located in the top of the keyboard 60 below the scrolling controls 26a, 28a, the cursor control 42 and fixed buttons 40. Although shown to be located in the top of the keyboard, the location of these additional connections can be placed at any convenient location on the keyboard. FIG. 4 illustrates an end view of the a slot 62 for an insertable electronic circuit card, a port configured to interface with a telephone line that is part of a public-switched telephone network (PSTN) 64, a USB port 66, a and an expansion slot configured to receive a memory card 68. FIG. 4 also illustrates an infrared port 70, which enables the universal keyboard to wirelessly transmit or receive data. Although not illustrated in FIG. 4, additional connections are incorporated into the universal keyboard 1. These additional connections include such items as a serial-port interface and/or a parallel-port interface. As stated in connection with FIG. 2, a person of skill in the relevant art would recognize that other connections and expansion capabilities are incorporated into the keyboard in alternate locations in addition to those described and illustrated and that the aforestated list of additional connections to the universal keyboard is merely illustrative and not meant to be limiting in any manner.

FIG. 5a is a top view of the keyboard 1 showing it operating in the alphanumeric functional mode with the domain-level values assigned to each input key 30 in the "A-L" domain level. The domain-level value associated with each input key 30 is shown in the respective displays 32 associated with each input key 30. For example, the left input key in the top row is assigned a domain-level value corresponding to the letter "A" or "a". The display 32 associated with the left input key 30 of the first row visually shows, by highlighting the letter "A", that pressing that input key will correspond to selecting the letter "A" on a traditional keyboard. The remaining programmable input keys 30 correspond to the highlighted letter on the display 32 associated with each programmable input key 30.

Figure 5B:
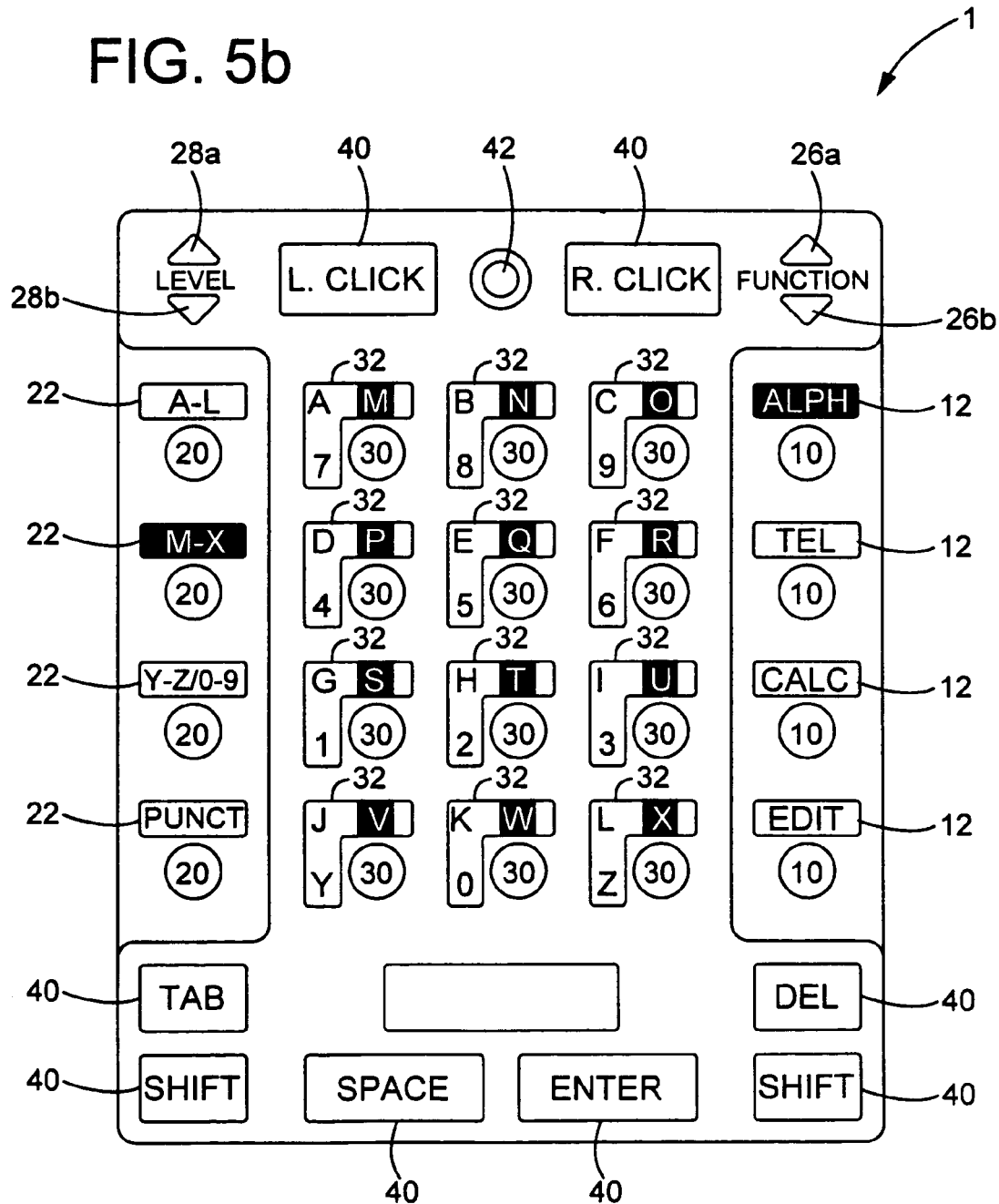
FIG. 5b is a top view of the keyboard illustrating the keyboard operating in alphanumeric functionality with the domain-level values assigned to each input key in the "M-X" domain level.

Located within each display 32 in FIG. 5a are additional numbers and/or letters associated with each programmable input key 30. These additional numbers and/or letters represent alternative domain-level values, which are associated with each programmable input key 30 depending upon the domain level selected by the user. For example, when the "M-X" domain level is selected while the universal keyboard is operating in the alphanumeric functionality, the highlighted letters change to correspond to the domain-level values of the selected domain level. The selection of the "M-X" domain level and the domain-level values associated with each programmable input key 30 is illustrated in FIG. 5b. Therefore, the programmable input key 30 located on the left side of the first row corresponds to the letter "A" in the "A-L" domain level; however, the same programmable input key 30 corresponds to the letter "M" after the "M-X" domain level is selected by the keyboard user. As described in connection with FIG. 5a, the display 32 associated with each programmable input key 30 in FIG. 5b shows alternative domain-level values associated with each programmable input key for a given functionality or combination of functionalities.

Figure 5C:
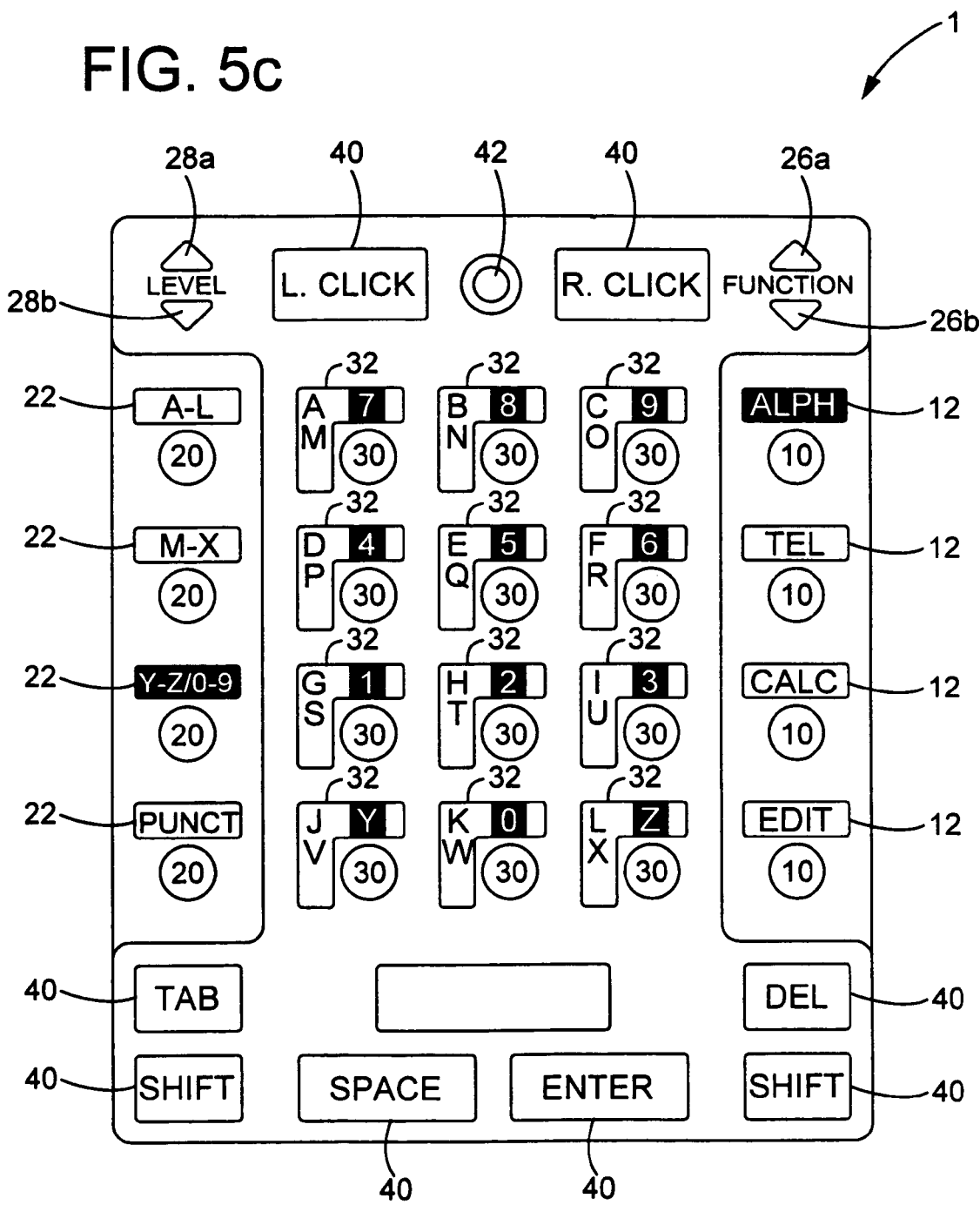
FIG. 5c is a top view of the keyboard illustrating the keyboard operating in alphanumeric functionality with the domain-level values assigned to each input key in the "Y-Z/0-9" domain level.

By selecting the "Y-Z/0-9" domain level within the alphanumeric functionality, as shown in FIG. 5c, the domain-level values associated with each programmable input key again changes. Selection of the "Y-Z/0-9" domain level assigns a domain-level value to the left programmable input key of the first row equivalent to the number "7" as illustrated in FIG. 5c. Also shown in FIG. 5c are displays 32 which contain alternative domain-level values for each programmable input key 30 within each domain level within the alphanumeric functionality.

Figure 5D:
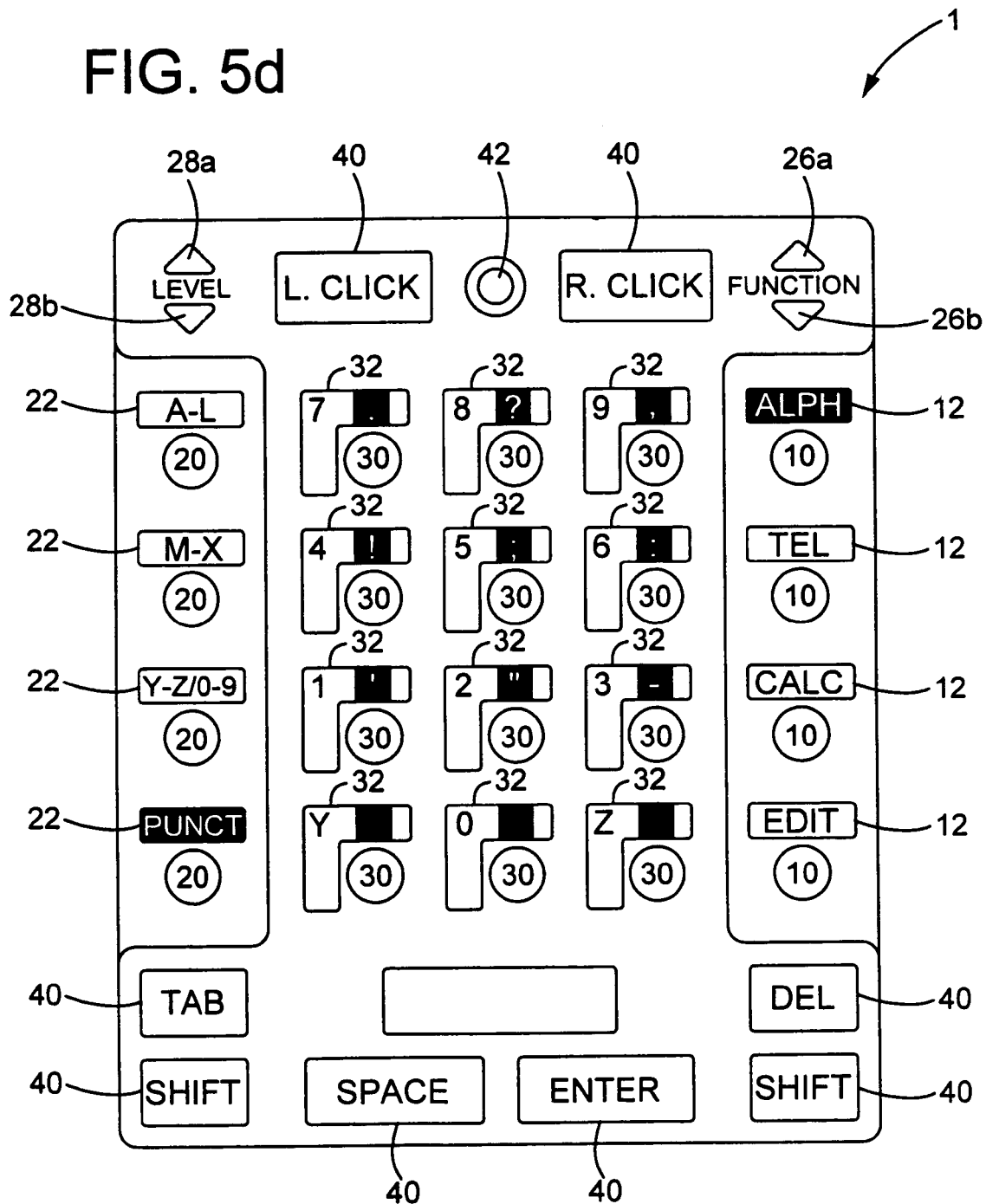
FIG. 5d is a top view of the keyboard illustrating the keyboard operating in alphanumeric functionality with the domain-level values assigned to each input key in the "PUNCT" domain level.

Shown in FIG. 5d is selection of the "PUNCT" domain level within the alphanumeric functionality. Selection of the PUNCT domain level assigns different domain-level values to each of the programmable input keys corresponding with a variety of punctuation marks which can be from any language, although English-language punctuation marks are illustrated. The last row of programmable input keys 30 shown in FIG. 5d do not have a domain-level values assigned to them. This allows a user to define their own domain-level value to be associated with the previously undefined programmable input keys.

Figure 5E:
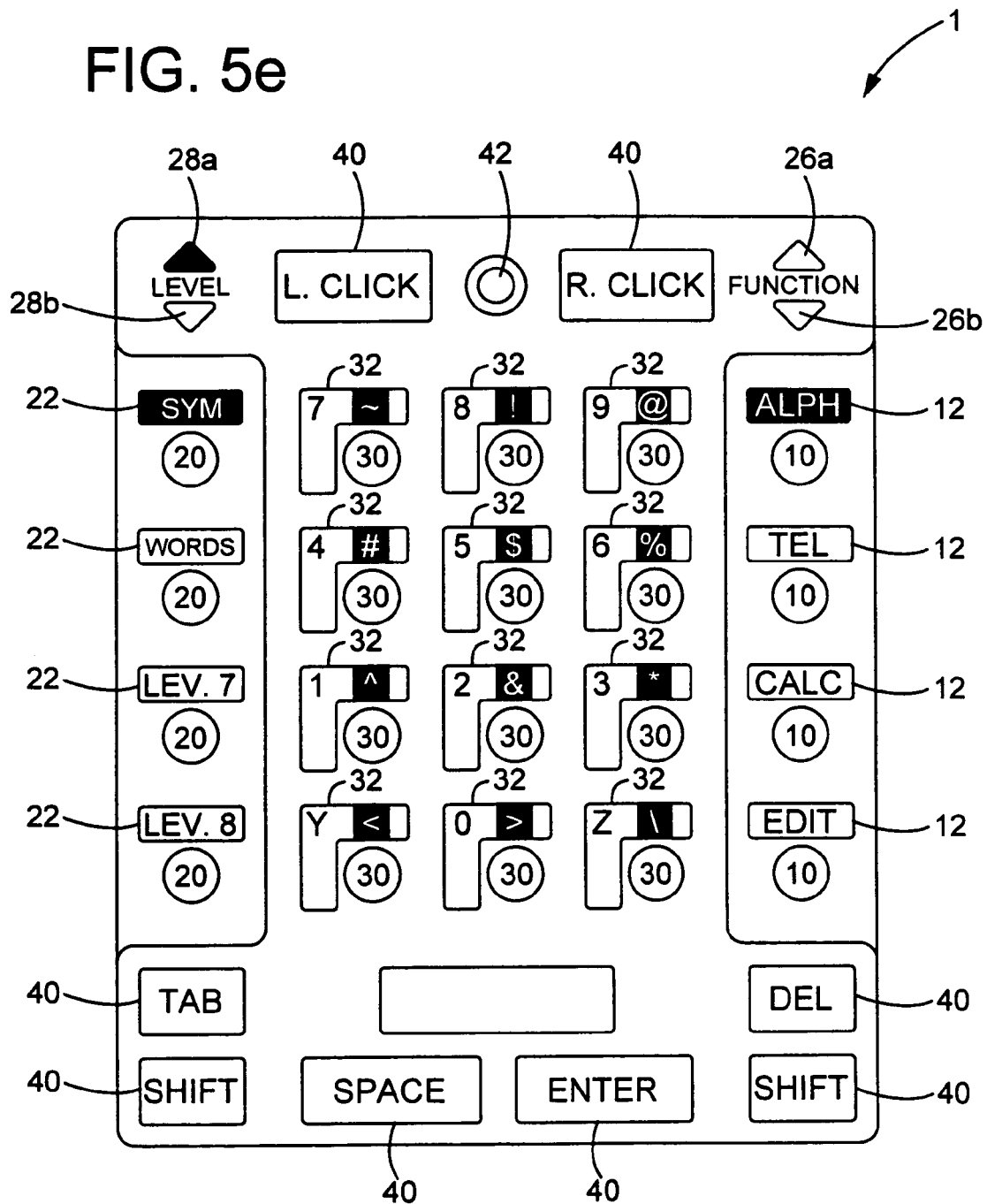
FIG. 5e is a top view of the keyboard illustrating the keyboard operating in alphanumeric functionality with the domain-level values assigned to each input key in the "SYM" domain level.

FIG. 5e is a top view of the keyboard operating in alphanumeric functionality showing the programmable input key assignments in the "SYM" domain level. This domain level, within the alphanumeric functionality, is reached by actuating the domain-scrolling control 28a. For example, the first four possible domain levels within the alphanumeric functionality are illustrated in FIGS. 5a-d. The next four domain levels for the alphanumeric functionality are displayed by actuating the domain-scrolling control 28a. Although illustrated as scrolling through four domain levels, any number of domain levels can be scrolled through. The next four possible domain levels in the example shown in FIG. 5 are "SYM" and "WORDS" and two undefined domain levels, "LEV 7" and "LEV 8" which are defined by the user of the universal keyboard. Indeed, additional domain levels beyond eight illustrated in FIGS. 5a-e are also user or application-provider defined within a selected keyboard functionality. Although shown to change all four domain levels associated with the domain-level controls 20, pressing a domain-scrolling controls 28a or 28b can change any number of the domain levels available for selection by the keyboard user.

The displays 32 associated with each programmable input key 30 in FIG. 5e highlight the command or function associated with the current domain-level value as well as alternative domain-level values. The alternate domain level values shown in the displays 32 in FIG. 5e can be accessed by using the domain scrolling controls 28a and 28b.

Figure 5F:
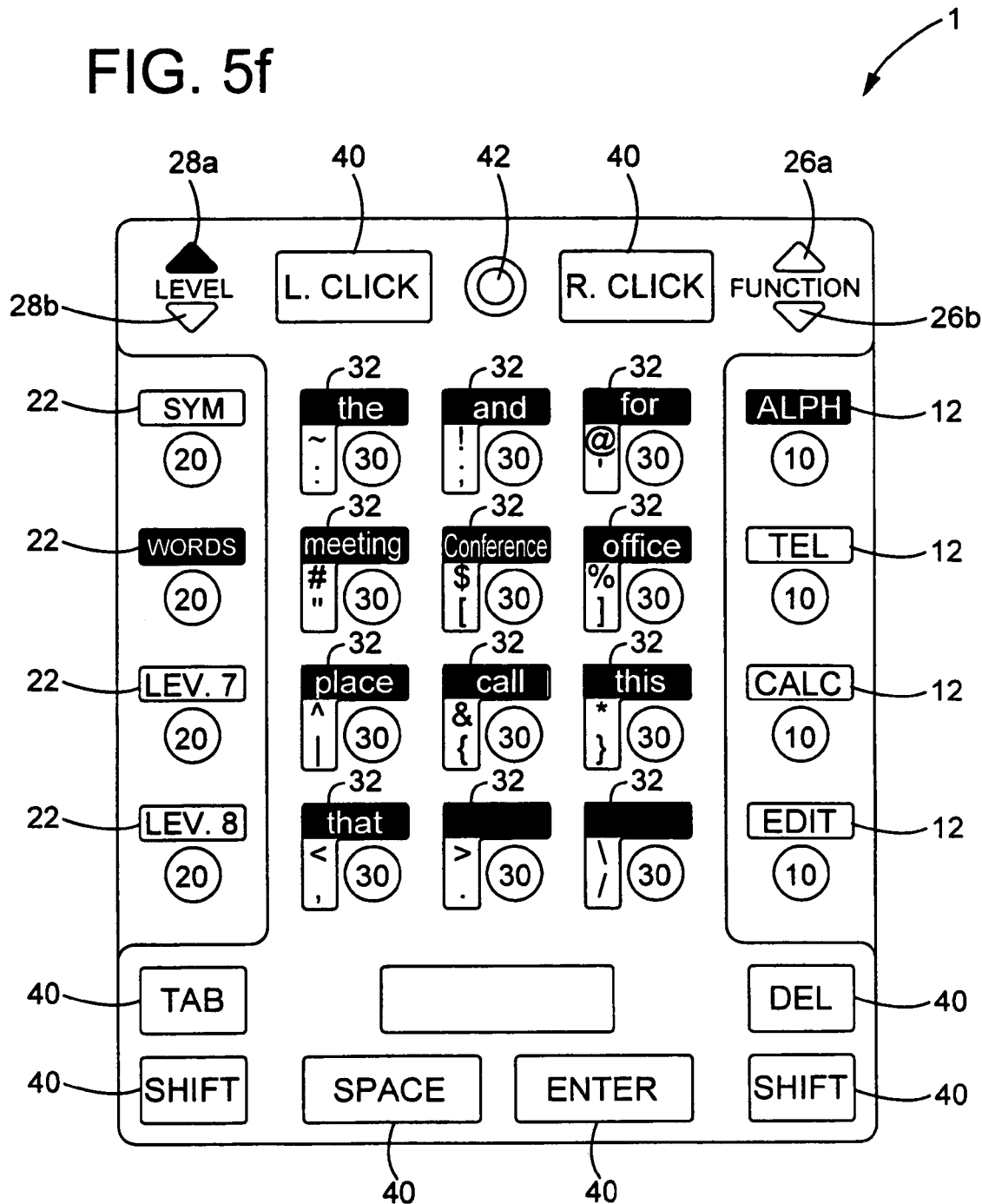
FIG. 5f is a top view of the keyboard illustrating the keyboard operating in alphanumeric functionality with the domain-level values assigned to each input key in the "WORDS" domain level.

Shown in FIG. 5f is a top view of the universal keyboard operating in a "WORDS" domain level within the alphanumeric functionality. Selection of a "WORDS" domain level assigns different domain-level values to each of the programmable input keys 30 corresponding with a variety of English-language words. Additionally, acronyms, non-English language words, phrases, or an entire document are similarly assigned a domain-level value.

As illustrated and described in connection with FIG. 1, FIGS. 5a-e and FIG. 6 also show functional-mode controls 10, functional-mode screens 12, domain-level controls 20, domain-level screens 22, programmable input keys 30, displays 32, functionality scrolling controls 26a and 26b, domain scrolling controls 28a and 28b, fixed keys 40 and a cursor control 42.

Figure 6:
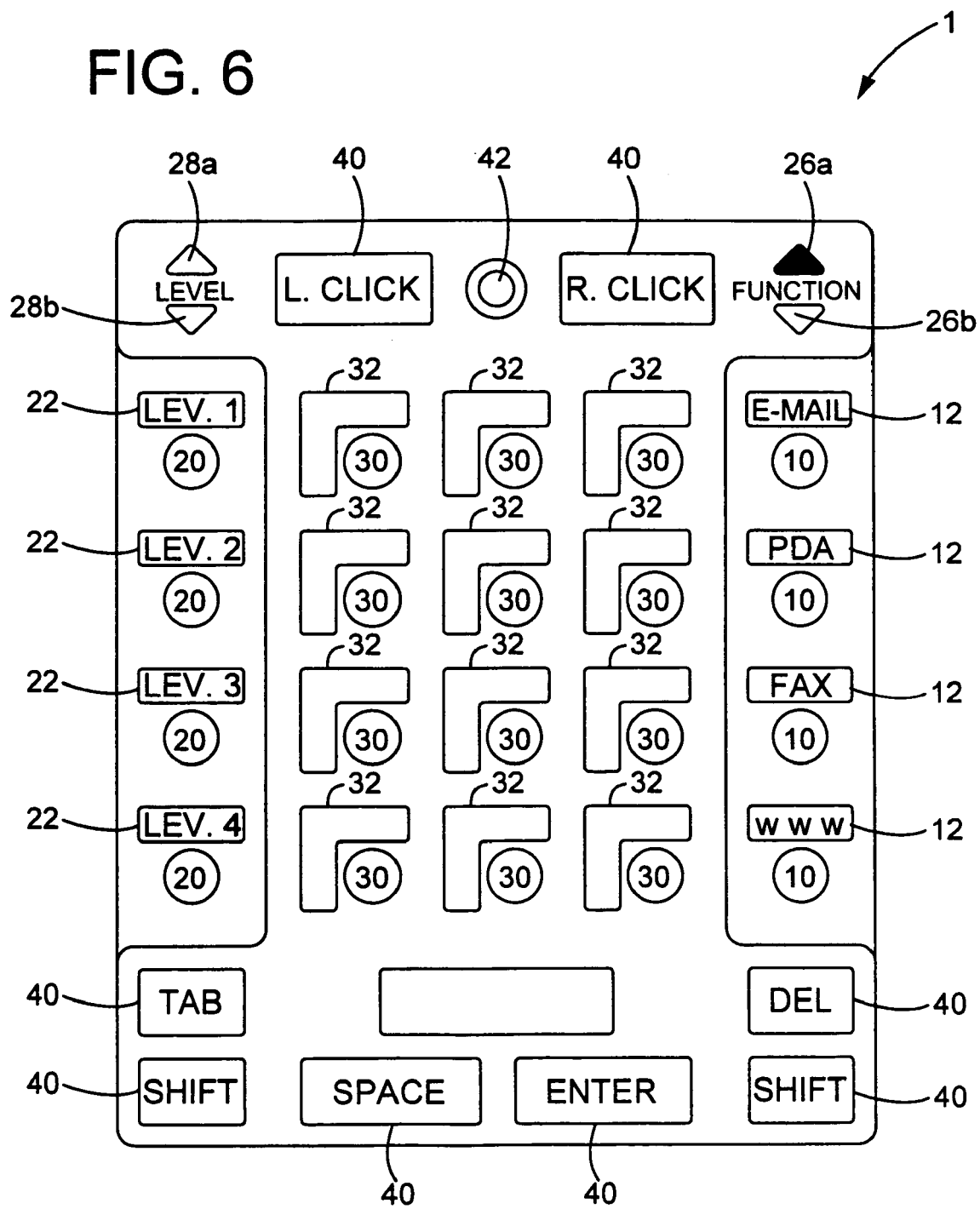
FIG. 6 is a top view of the keyboard showing additional keyboard functionalities.

FIG. 6 is a top view of the universal keyboard showing additional keyboard functionalities. Upon actuating the functionality-scrolling control 26a, the available functionalities of the keyboard are scrolled to display four previously undisplayed functionalities choices. As described in connection with FIGS. 5a-e, selection of a functionality will then allow the keyboard user to select the desired domain level within a particular functionality. As shown in FIG. 6, because no keyboard functionality has been selected, there are no domain levels to be selected by the user. Therefore, the domain controls have been generically labeled as "LEV 1", "LEV 2", "LEV 3" and "LEV 4" to indicate four different domain levels.

Figure 7:
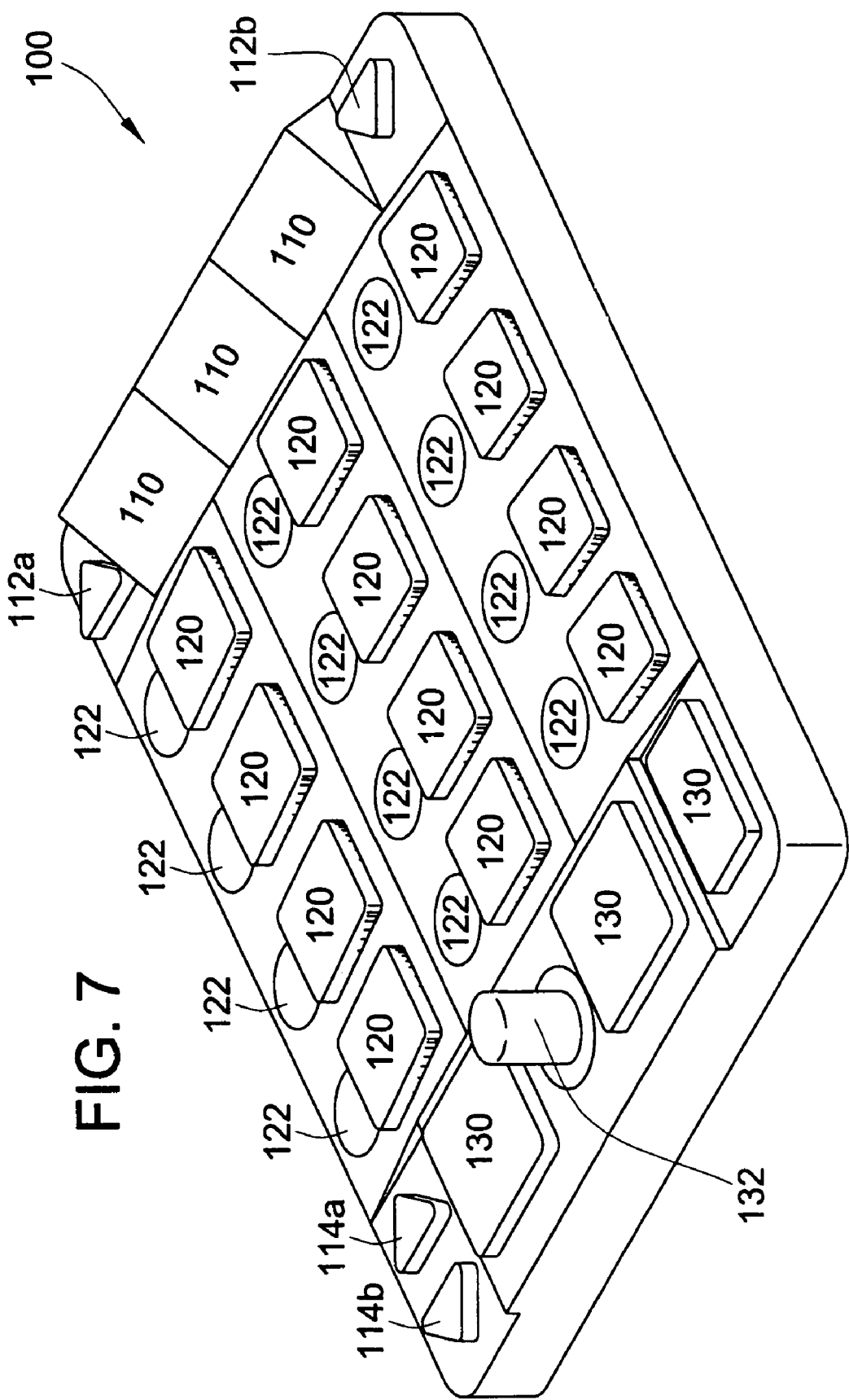
FIG. 7 is a top isometric view of an alternative embodiment of the universal keyboard as viewed from the bottom right-hand corner of the keyboard.

FIG. 7 is a top isometric view of an alternative embodiment of the universal keyboard 100 as viewed from the bottom right-hand corner of the keyboard. The operation of the universal keyboard 100 shown in FIG. 7 is similar to that described in connection with FIGS. 1 thru 6. The keyboard in FIG. 7 has several functionalities with each functionality having one or more domain levels selected by the user.

FIG. 7 illustrates a plurality of functional-mode screens 110 for indicating and selecting the functional mode of operation of the keyboard 100. The functional-mode screen 110 indicates which functional mode is currently activated.

Located on the keyboard 100 is a set of functionality scrolling controls 112a and 112b for selecting the desired mode of device functionality. Actuating functionality scrolling control 112a the list of keyboard functionalities will scroll such that alternative functionalities are displayed on the functional-mode screens 110 for selection by the user.

Also located on the keyboard 100 in FIG. 7 is a set of domain scrolling controls 114a and 114b for selecting the desired domain level within a selected functionality. In a manner similar to that described in conjunction with FIGS. 1-6, by actuating the domain scrolling controls 114a and 114b, the keyboard user scrolls through the various domain levels within a functionality.

Located on the keyboard 100 is a plurality of programmable input keys 120 comprising a keypad for transmitting the commands associated with each domain-level value associated with a particular programmable input key 120. Associated with each programmable input key 120 is a display 122. The displays provide a visual indication of the current domain-level value associated with each programmable input key 120 as well as alternative domain-level values available within a selected functionality.

Also illustrated in FIG. 7 is a plurality of fixed keys 130 having a defined operation. The defined operation of each fixed key 130 is independent of the functionality of the input device selected by the user. The defined operation of the fixed keys are operations which are found on traditional keyboards such as Esc, Alt, Ctrl, Shift, Caps Lock, Tab, Enter, Backspace, Delete, and Spacebar. Additionally, these fixed keys can also function in a manner identical to that of a right-mouse click, a left-mouse click or scroll. Also illustrated in FIG. 7 is a cursor control 132 for controlling the location of the cursor.

FIG. 8 is a top isometric view of the universal keyboard 100 as viewed from the top left-hand corner of the keyboard. All of the operational features of the keyboard 100 are identical to that described in connection with FIGS. 1-7. FIG. 8 illustrates additional connections which are incorporated into the universal keyboard. As shown in FIG. 8, the additional connections are located in the top of the keyboard 140 below the functional-mode screens 110 and the functionality scrolling controls 112a and 112b. Although shown to be located in the top of the keyboard, the location of these additional connections can be placed at any convenient location on the keyboard. The additional connections may include an infrared port 142, which enables the universal keyboard to wirelessly transmit or receive data, as well as a USB port 144. Additional features added to the keyboard 100 in FIGS. 8-11 include a slot for an insertable electronic circuit card wherein the slot is configured in accordance with one of the standard designs used for insertable electronic circuit cards, such as the PCMCIA standard, a port configured to interface with a telephone line that is part of a public-switched telephone network (PSTN), a serial-port interface, a parallel-port interface, and/or an expansion slot configured to receive a memory card. A person of skill in the relevant art would recognize that other expansion capabilities could be incorporated into the keyboard in alternate locations in addition to those described and illustrated and that the aforestated list of additional connections to the universal keyboard is merely illustrative and not meant to be limiting in any manner.

FIG. 9 is a bottom-end view of the embodiment of the keyboard 100 shown in FIGS. 7 and 8. FIG. 9 illustrates several fixed keys 130, functional-mode screens 110, a cursor control 132 and a domain scrolling control 114b.

FIG. 10 is a top-end view of the embodiment of the keyboard 100 shown in FIGS. 7 and 8. FIG. 10 is a top end view of the universal keyboard 100. FIG. 10 illustrates additional connections to the universal keyboard located in the top of the keyboard 140 below the functional-mode screens 110 and the functionality-scrolling controls 112a and 112b. Although shown to be located in the top of the keyboard, the location of these additional connections are placed at any convenient location on the keyboard. FIG. 10 illustrates an infrared port 142, which enables the universal keyboard to wirelessly transmit or receive data, as well as a USB port 144.

Although not illustrated in FIG. 10, additional connections are incorporated into the universal keyboard 1 such as a serial-port interface, a parallel-port interface, a slot for an insertable electronic circuit card, a port configured to interface with a telephone line that is part of a public-switched telephone network (PSTN), and an expansion slot configured to receive a memory card. As stated in connection with FIG. 8, a person of skill in the relevant art would recognize that other connections and expansion capabilities are incorporated into the keyboard in alternate locations in addition to those described and illustrated and that the aforestated list of additional connections to the universal keyboard is merely illustrative and not meant to be limiting in any manner. Optionally, the keyboard illustrated in FIG. 10 may also contain fewer additional connections or expansion capabilities.

Figure 11:
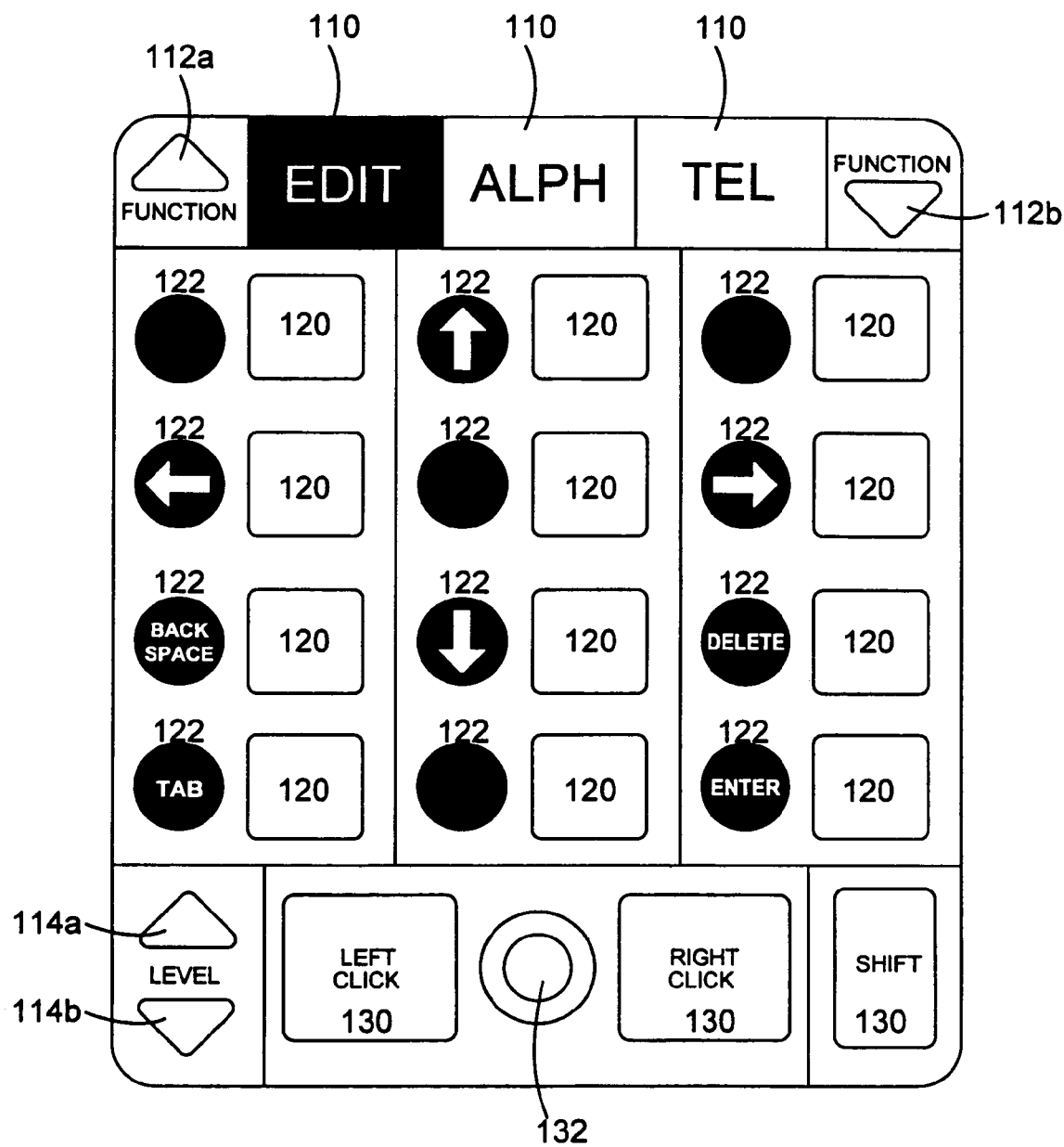
FIG. 11 is a top view of the embodiment of the keyboard shown in FIGS. 7 and 8.

FIG. 11 is a top view of the keyboard 100 showing the keyboard operating in the "EDIT" functionality and the domain level associated with the edit operations illustrated in FIG. 11. With the "EDIT" highlighted in the functional-mode screens 110, the keyboard user has a visual indication of the keyboard's current functionality. Different functionalities for the keyboard 100 are scrolled through for selection by pressing the functionality-scrolling controls 112a and 112b. Also illustrated in FIG. 11 are a set of domain scrolling controls 114a and 114b for selecting the desired domain level within a selected functionality.

FIG. 11 illustrates a plurality of programmable input keys 120 for entering data. Each programmable input key 120 has an assigned domain-level value depending upon the domain level selected by the user. Associated with each programmable input key 120 is a display 122. Each display 122 provides a visual indication of the domain-level value associated with each programmable input key 120 within the selected domain. Also shown in FIG. 11 is a plurality of fixed keys 130 having a defined operation. The defined operation of each fixed key 130 is independent of the functionality of the input device selected by the user. The defined operation of the fixed keys are operations which are found on traditional computer keyboards and on a computer mouse. Also illustrated in FIG. 11 is a cursor control 132 for controlling the location of the cursor.

Figure 12:
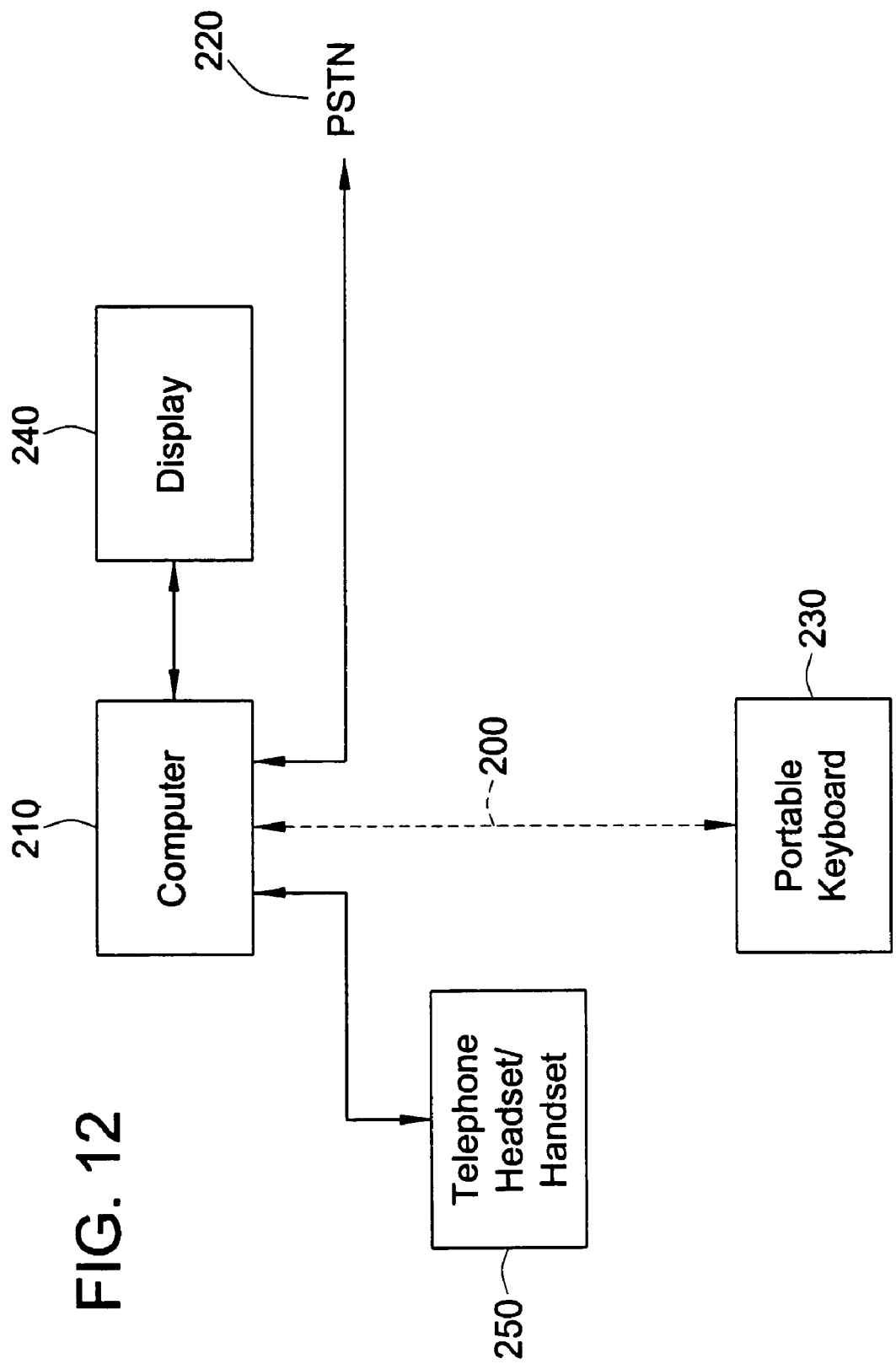
FIG. 12 is a schematic diagram showing a wireless connection between the universal keyboard and a computer connected to a PSTN.

FIG. 12 is a schematic diagram showing a wireless connection 200 between a computer 210 connected to a PSTN 220 and the universal keyboard 230. The wireless connection 200 between the universal keyboard and the computer, represented by a dashed line in FIG. 12, allows the alphanumeric characters associated with each programmable input key, when operating in the alphanumeric functionality, to be displayed by virtue of a display 240 or monitor connected to the computer 210. Also, information transmitted to the computer 210 from a telephone headset/handset 250 can be transmitted via the computer 210 to the universal keyboard 230. Additionally, data transmitted between the universal keyboard and the computer is then be transmitted via the PSTN to any desired location.

Figure 13:
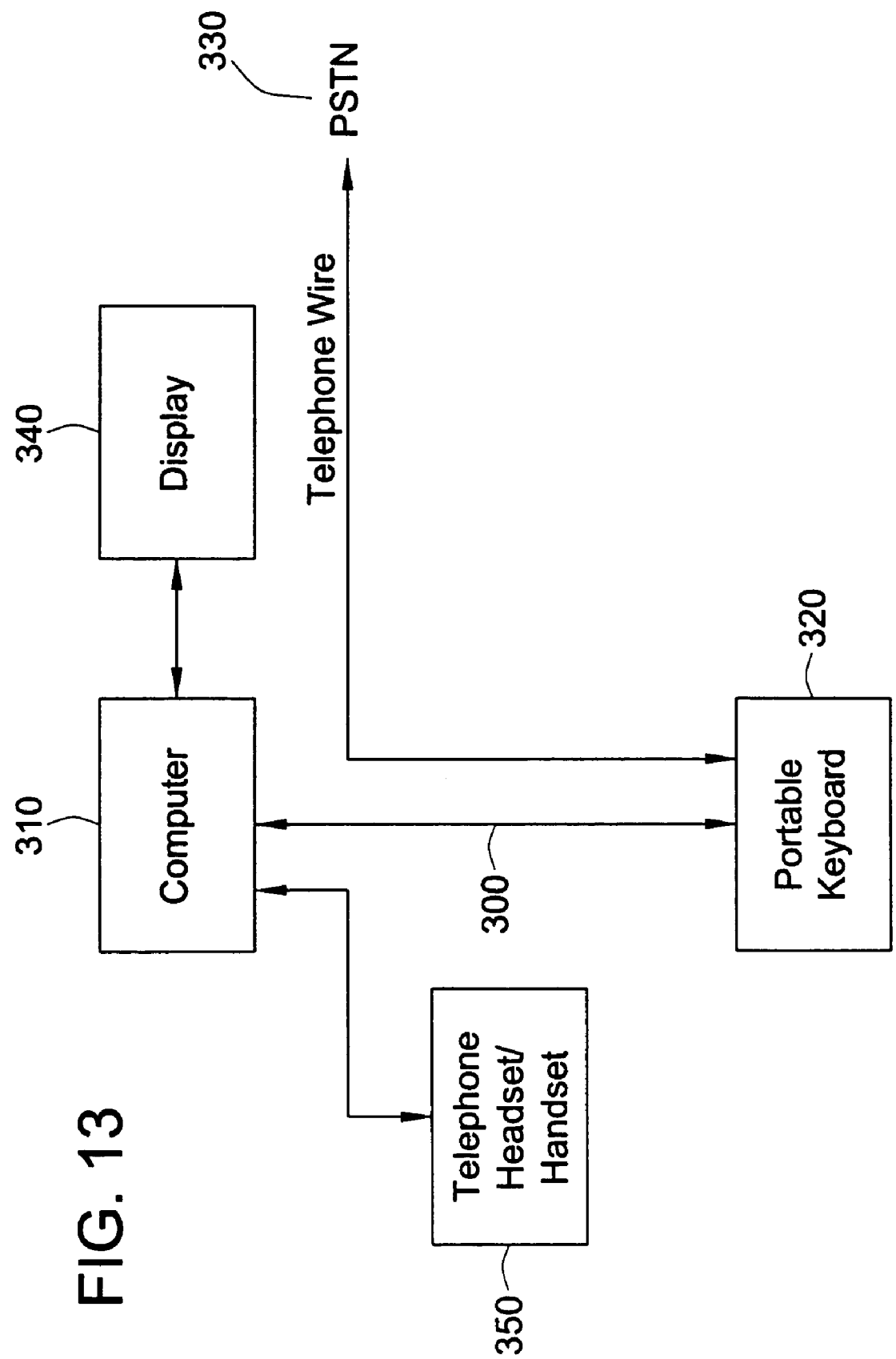
FIG. 13 is a schematic diagram showing a wire connection between a computer and the universal keyboard connected to a PSTN.

FIG. 13 is a schematic diagram showing a wire connection 300 between a computer 310 and the universal keyboard 320 which is connected to a PSTN 330. The PSTN port located in the universal keyboard allows data to be transmitted via the PSTN 330 from the universal keyboard without passing through the computer. However, the wire connection between the universal keyboard and the computer allows a visual representation of the programmable input keys to be seen by the keyboard user on the display 340. Also, information transmitted to the computer 310, for example from a telephone headset/handset 350, can be transmitted via the computer 310 to the universal keyboard 320 by virtue of the connection 300. Additionally, data can be sent from the universal keyboard 320 directly to other devices or through the computer 310.

Figure 14:
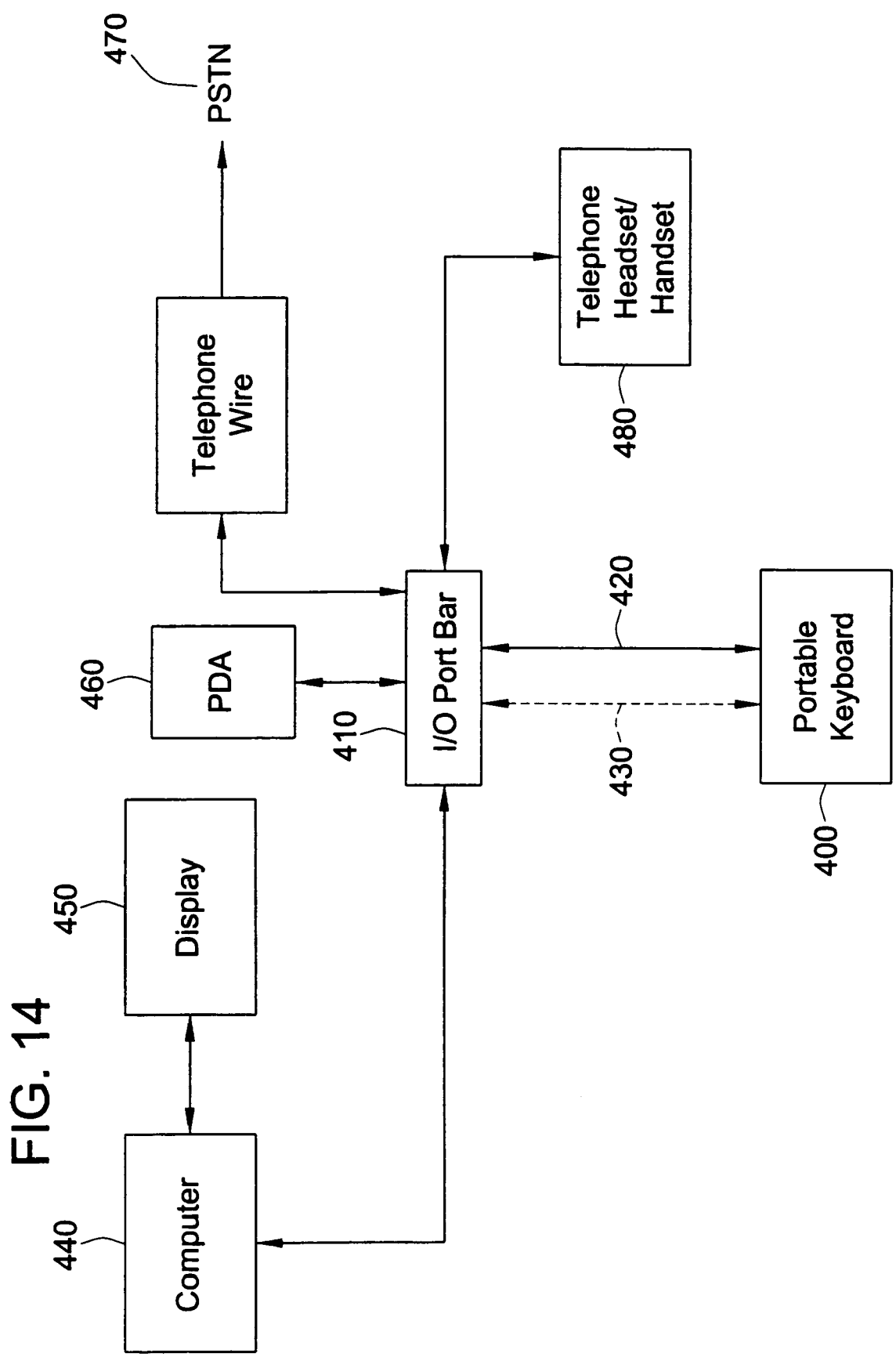
FIG. 14 is schematic diagram showing the universal keyboard connected to a variety of devices through an I/O Port Bar.

FIG. 14 is a schematic diagram showing the universal keyboard 400 connected to a variety of devices through an input/output port bar 410. The output of the universal keyboard 400 can be transmitted to the port bar 410 through either a wire connection 420 or through a wireless transmission 430. The signal generated by the universal keyboard 400 is then transmitted to a number of devices such as a computer 440, a display 450, a PDA (personal digital assistant) 460 or transmitted to a remote location via the PSTN 470. Additionally, a signal received by the input/output port bar 410 from a remote location can then be transmitted to the universal keyboard. Also, any signal transmitted to the input/output port bar 410, for example from a telephone headset/handset 480, can be transmitted to the universal keyboard 400 by virtue of the wire connection 420 or wireless connection 430.

FIG. 15 is a top isometric view of the universal keyboard 1 illustrating the use of an additional unit 500 for two-handed operation of the keyboard. The presence of the additional unit 500 with the keyboard 1 allows the user to operate the keyboard with two hands to speed the entry of data. FIG. 15 shows the keyboard 1 operating in the alphanumeric functionality and the "A-L" domain level. The domain level has been selected by use of the additional unit 500; however, the domain level is also selected by pressing the equivalent button 505 on the keyboard 1. Although, the additional unit 500 is shown displaying the same domain level as shown on the keyboard 1, domain levels in addition to those shown on the keyboard could be displayed for selection by the user on the additional unit 500. Also, the additional unit 500 could display functionalities in addition to those shown on the keyboard 1 in FIG. 15.

In FIG. 15, the additional unit 500 is shown as a separate unit with a wire connection back to the keyboard 1; however, this connection can also be wireless. The additional unit 500 also takes the form of a swiveling or pivoting unit such that the domain-level controls 20 can be reoriented relative to the keyboard 1 while maintaining their physical connection to the keyboard 1. Also, the additional unit 500 can be an integral part of a single unit with the keyboard 1, such as use in connection with another device such as an automobile, an airplane (e.g., arm rest, seat back or cockpit), a lap-top computer (replacing the current QWERTY-style keyboard), PDA (personal digital assistant), a cell phone (replacing the current standard key pad) or a household device such as a refrigerator or television set.

It will be noted by those persons of ordinary skill in the art that the various components that comprise the universal keyboard embodiments described herein such as the functional-mode controls 10, functional-mode screens 12, domain-level controls 20, domain-level screens 22, the scrolling controls 26a, 26b, 28a, 28b, programmable input keys 30, the displays 32, jack 46, card reader 44, the slot for an insertable electronic card 62, PSTN port 64, USB port 66, serial or parallel-port interfaces, expansion slot for receiving a memory card 68 or an infrared port 70 as well as any software or microprocessors needed for the keyboard may each be implemented using any one of several known off-the-shelf components.

Additionally, various companies can be utilized to outsource the fabrication and assembly of components for consumer electronics. These companies include Solectron of Milpitas, Calif. and Flextronics of Singapore. Additionally, other companies can be engaged to assist in the manufacture and design of the microelectronics required for the universal keyboard. Companies such as Solectron and Flextronics can be utilized to assist in the selection of components, chip design, material selection, software development and manufacturing.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. Accordingly, the invention should only be limited by the appended claims and equivalents thereof, which claims are intended to cover such other variations and modifications as come within the spirit and scope of the invention.

What is claimed is:

1. An information input device, comprising:
   at least a first functional mode of operation supported by the input device;
   a domain control for selecting one of multiple domain levels within the first functional mode wherein each domain level is associated with a set of domain-level values;
   a domain control display for dynamically presenting descriptors associated with the multiple domain levels;
   a plurality of input keys, separate and distinct from the domain control, assigned to the set of domain-level values, wherein each input key assigned to a domain-level value is associated with a signal, representative of the domain-level value, transmitted by the input device in response to actuation of the input key; and
   a function-specific display, distinct from the domain control display, indicating a domain-level value associated with each input key for a currently selected functional mode and domain level combination, wherein the input keys and domain control are simultaneously presented by the input device, and wherein the function-specific display dynamically provides a visual indication of a present domain-level value for each of the input keys.

2. The invention as in claim 1 wherein the at least a first functional mode comprises multiple functional modes, and further comprising a functional mode control for selecting one of the multiple functional modes.

3. The invention as in claim 2 further comprising a screen associated with the functional mode control wherein the screen indicates a functionality associated with the functional mode control.

4. The invention as in claim 1 wherein the domain-level value assigned to an input key is determined by software.

5. The invention as in claim 1 wherein the domain-level value associated with an input key is assignable by a user.

6. The invention as in claim 1 further comprising a software application specifying a domain-level value for an input key.

7. The invention as in claim 1 wherein the function-specific display provides a visual indication of alternative domain-level values for a set of the input keys.

8. The invention as in claim 1 wherein the function-specific display comprises a set of displays, wherein each display of the set of displays is associated with a single input key to provide a visual indication of a present domain-level value for the input key.

9. The invention as in claim 1 wherein the function-specific display comprises a set of displays, wherein each display of the set of displays is associated with a single input key and provides a visual indication of an alternative domain-level value for the input key.

10. The invention as in claim 1 wherein the function-specific display is integrated with the input keys.

11. The invention of claim 10 wherein the function-specific display comprises a set of displays, wherein each display of the set of displays is placed upon a face of a corresponding input key.

12. The invention as in claim 11 wherein each display of the set of displays is comprised of a touch screen.

13. The invention as in claim 1 wherein the domain control display comprises a screen associated with the domain control and wherein the screen indicates domain-level values associated with a selectable domain-level.

14. The invention as in claim 1 further comprising a plurality of fixed operation keys having a defined operation independent of the functionality of the input device.

15. The invention as in claim 14 wherein the defined operation of a fixed key is selected from the group consisting of: Tab, Shift, Space, Enter, Delete, Backspace, right mouse click, left mouse click, and scroll.

16. The invention as in claim 2 wherein the functional mode control comprises a plurality of user interface keys for selecting one of the multiple functional modes of the information input device.

17. The invention as in claim 1 wherein the first functional mode is selected from a group consisting of: an English alphanumeric keyboard, a non-English alphanumeric keyboard, telephone, calculator, card reader, text editing, internet navigation, and an application specific mode associated with the use of a particular software application.

18. The invention as in claim 1 wherein the information input device is an integral component of a second device.

19. The invention as in claim 18 wherein the second device is selected from a group consisting of an automobile, an airplane, a lap-top computer, a PDA, a cellular telephone and any household appliance.

20. The invention as in claim 1 wherein the function-specific display comprises a set of displays, wherein each display of the set of displays is associated with a single input key and provides a visual indication of an alternative domain-level value for the input key.

21. The invention as in claim 1 wherein the domain-level value associated with an input key is assignable by a user.

22. The invention as in claim 1 further comprising a software application specifying a domain-level value for an input key.

23. The invention as in claim 1 wherein the function-specific display dynamically provides a visual indication of a present domain-level value for each of the input keys.

24. An information input device, comprising:
    at least a first functional mode of operation supported by the input device;

a domain control for selecting one of multiple domain levels within the first functional mode wherein each domain level is associated with a set of domain-level values;

a domain control display for dynamically presenting descriptors associated with the multiple domain levels;

a plurality of input keys, separate and distinct from the domain control, assigned to the set of domain-level values, wherein each input key assigned to a domain-level value is associated with a signal, representative of the domain-level value, transmitted by the input device in response to actuation of the input key; and a function-specific display, distinct from the domain control display, indicating a domain-level value associated with each input key for a currently selected functional mode and domain level combination, wherein the input keys and domain control are simultaneously presented by the input device, and wherein the function-specific display provides a visual indication of alternative domain-level values for a set of the input keys.

25. The invention as in claim 24 wherein the at least a first functional mode comprises multiple functional modes, and further comprising a functional mode control for selecting one of the multiple functional modes.

26. The invention as in claim 25 further comprising a screen associated with the functional mode control wherein the screen indicates a functionality associated with the functional mode control.

27. The invention as in claim 24 wherein the domain-level value associated with an input key is assignable by a user.

28. The invention as in claim 24 further comprising a software application specifying a domain-level value for an input key.

29. The invention as in claim 24 wherein the function-specific display comprises a set of displays, wherein each display of the set of displays is associated with a single input key to provide a visual indication of a present domain-level value for the input key.

30. An information input device, comprising:
at least a first functional mode of operation supported by the input device;

a domain control for selecting one of multiple domain levels within the first functional mode wherein each domain level is associated with a set of domain-level values;

a domain control display for dynamically presenting descriptors associated with the multiple domain levels;

a plurality of input keys, separate and distinct from the domain control, assigned to the set of domain-level values, wherein each input key assigned to a domain-level value is associated with a signal; representative of the domain-level value, transmitted by the input device in response to actuation of the input key; and a function-specific display, distinct from the domain control display, indicating a domain-level value associated with each input key for a currently selected functional mode and domain level combination, wherein the input keys and domain control are simultaneously presented by the input device, wherein the function-specific display comprises a set of displays, and wherein each display of the set of displays is associated with a single input key and provides a visual indication of an alternative domain-level value for the input key.

31. The invention as in claim 30 wherein each display of the set of displays is associated with a single input key to provide a visual indication of a present domain-level value for the input key.

32. The invention as in claim 30 wherein the at least a first functional mode comprises multiple functional modes, and further comprising a functional mode control for selecting one of the multiple functional modes.

33. The invention as in claim 32 further comprising a screen associated with the functional mode control wherein the screen indicates a functionality associated with the functional mode control.

* * * * *

UNITED STATES PATENT AND TRADEMARK OFFICE
CERTIFICATE OF CORRECTION

PATENT NO.       : 7,250,898 B2
APPLICATION NO.  : 10/770832
DATED            : July 31, 2007
INVENTOR(S)      : Timothy B. Higginson Page 1 of 1

It is certified that error appears in the above-identified patent and that said Letters Patent is hereby corrected as shown below:

On Title Page

Related U.S. Application Data

Item (60) should read --Provisional application No. 60/323,680, filed on Sep. 20, 2001--.

Item (63) should read --Continuation of application No. 10/247,065, filed on Sep. 19, 2002--.

Signed and Sealed this

Eighteenth Day of March, 2008

JON W. DUDAS
*Director of the United States Patent and Trademark Office*